United States Patent
Kallio et al.

(10) Patent No.: US 12,272,000 B2
(45) Date of Patent: Apr. 8, 2025

(54) HIERARCHICAL DEPTH DATA GENERATION USING PRIMITIVE FUSION

(71) Applicant: ADVANCED MICRO DEVICES, INC., Santa Clara, CA (US)

(72) Inventors: Kiia K. Kallio, Inkoo (FI); Jan Achrenius, Noormakuu (FI)

(73) Assignee: Advanced Micro Devices, Inc., Santa Clara, CA (US)

( * ) Notice: Subject to any disclaimer, the term of this patent is extended or adjusted under 35 U.S.C. 154(b) by 210 days.

(21) Appl. No.: 17/853,136

(22) Filed: Jun. 29, 2022

(65) Prior Publication Data
US 2024/0005601 A1 Jan. 4, 2024

(51) Int. Cl.
- G06T 17/10 (2006.01)
- G06T 1/20 (2006.01)
- G06T 7/13 (2017.01)
- G06T 15/00 (2011.01)

(52) U.S. Cl.
CPC ............ *G06T 17/10* (2013.01); *G06T 1/20* (2013.01); *G06T 7/13* (2017.01); *G06T 15/005* (2013.01)

(58) Field of Classification Search
CPC .. G06T 17/10; G06T 1/20; G06T 7/13; G06T 15/005
See application file for complete search history.

(56) References Cited

U.S. PATENT DOCUMENTS

| | | | |
|---|---|---|---|
| 6,362,818 B1 * | 3/2002 | Gardiner | G06T 15/40 345/426 |
| 9,684,995 B2 * | 6/2017 | Yang | G06T 15/04 |
| 9,865,085 B1 * | 1/2018 | Eng | G06T 17/005 |
| 9,934,548 B2 * | 4/2018 | Smith | G06T 1/20 |
| 10,497,085 B2 * | 12/2019 | Lee | G06T 1/60 |
| 10,839,595 B2 * | 11/2020 | Ranganathan | G06T 11/40 |
| 11,361,400 B1 * | 6/2022 | Kjoll | G06T 1/20 |
| 11,532,115 B2 * | 12/2022 | Yang | G06T 1/20 |
| 11,610,358 B2 * | 3/2023 | Jesus | G06T 9/00 |

(Continued)

FOREIGN PATENT DOCUMENTS

| | | | | |
|---|---|---|---|---|
| GB | 2591802 A | * | 8/2021 | G06T 1/20 |
| JP | 7100427 B2 | * | 7/2022 | G06F 16/2246 |

OTHER PUBLICATIONS

Non-Final Office Action issued in U.S. Appl. No. 17/851,611, mailed Nov. 24, 2023, 19 pages.

(Continued)

*Primary Examiner* — Motilewa Good-Johnson

(57) ABSTRACT

Concurrently with performing a visibility pass to generate visibility data for two or more bins of an image, a processing system determines whether a primitive to be rendered covers at least a predetermined threshold percentage of a tile of the image. In response to the primitive coving at least the predetermined threshold percentage of the tile, the processing system stores the depth data of the primitive in a depth buffer for pixel-based rendering. In response to the primitive not covering at least the predetermined threshold percentage of the tile, the processing system fuses the primitive with one or more preceding primitives sharing an edge with the primitive in the tile to generate a fused primitive. In response to the fused primitive being valid in the tile, the processing system passes the depth data of the fused primitive to the depth buffer.

18 Claims, 8 Drawing Sheets

(56) References Cited

U.S. PATENT DOCUMENTS

| | | | |
|---|---|---|---|
| 11,861,782 B2* | 1/2024 | Yang | G06T 15/005 |
| 11,922,555 B2* | 3/2024 | Jesus | G06T 15/04 |
| 11,928,776 B2* | 3/2024 | Howson | G06T 15/405 |
| 11,988,523 B2* | 5/2024 | Bhowmick | G01C 21/3867 |
| 2002/0097241 A1* | 7/2002 | McCormack | G06T 11/40 |
| | | | 345/423 |
| 2007/0139440 A1* | 6/2007 | Crow | G06T 11/203 |
| | | | 345/614 |
| 2007/0182734 A1* | 8/2007 | Levanon | G06T 17/005 |
| | | | 345/420 |
| 2011/0221743 A1* | 9/2011 | Keall | G06T 15/005 |
| | | | 345/419 |
| 2014/0043342 A1* | 2/2014 | Goel | G06T 9/00 |
| | | | 345/501 |
| 2014/0267375 A1* | 9/2014 | Kilgard | G06T 7/11 |
| | | | 345/611 |
| 2015/0363968 A1* | 12/2015 | Yang | G06T 7/13 |
| | | | 345/420 |
| 2015/0363969 A1* | 12/2015 | Yang | G06T 15/40 |
| | | | 345/422 |
| 2016/0098856 A1* | 4/2016 | Broadhurst | G06T 15/005 |
| | | | 345/422 |
| 2016/0364901 A1* | 12/2016 | Balci | G06T 15/005 |
| 2017/0024927 A1* | 1/2017 | Isomäki | G06T 17/20 |
| 2017/0270146 A1* | 9/2017 | Harrison | G06F 7/14 |
| 2018/0089890 A1* | 3/2018 | Shreiner | G06T 17/20 |
| 2018/0307490 A1 | 10/2018 | Hakura et al. | |
| 2018/0365885 A1* | 12/2018 | Yang | G06T 15/205 |
| 2020/0051314 A1* | 2/2020 | Laine | G06T 15/005 |
| 2020/0184715 A1* | 6/2020 | Goswami | G06F 13/10 |
| 2020/0250882 A1* | 8/2020 | Yang | G06T 15/005 |
| 2020/0380745 A1* | 12/2020 | Bhiravabhatla | G06T 11/40 |
| 2021/0174575 A1* | 6/2021 | Mandal | G06T 1/60 |
| 2021/0225060 A1 | 7/2021 | Tuomi et al. | |
| 2022/0036629 A1 | 2/2022 | Tuomi et al. | |
| 2022/0092801 A1* | 3/2022 | Achrenius | G06T 15/80 |
| 2022/0101479 A1 | 3/2022 | Alla et al. | |
| 2022/0198745 A1* | 6/2022 | Yang | G06T 7/13 |
| 2022/0392138 A1 | 12/2022 | Kokins et al. | |
| 2023/0298249 A1* | 9/2023 | Shao | G06T 15/005 |
| 2024/0005601 A1* | 1/2024 | Kallio | G06T 17/10 |
| 2024/0112397 A1* | 4/2024 | Brennan | G06T 15/30 |

OTHER PUBLICATIONS

U.S. Appl. No. 17/565,394, filed Dec. 29, 2021, Entitled "Synchronization Free Cross Pass Binning Through Subpass Interleaving", 35 pages.

U.S. Appl. No. 17/851,611, filed Jun. 28, 2022, Entitled "Binning Pass With Hierarchical Depth Data Determination" 44 pages.

U.S. Appl. No. 17/855,268, filed Jun. 30, 2022, Entitled "Pipeline Delay Reduction for Coarse Visibility Compression" 40 pages.

Final Office Action issued in U.S. Appl. No. 17/851,611, mailed Jun. 21, 2024, 25 pages.

* cited by examiner

HIERARCHICAL DEPTH DATA GENERATION USING PRIMITIVE FUSION

BACKGROUND

In a graphics processing system, three-dimensional scenes are rendered by accelerated processing units for display on two-dimensional displays. To render such scenes, the graphics processing system receives a command stream from an application indicating various primitives to be rendered for the scene. The graphics processing system then renders these primitives according to a graphics pipeline that has different stages each including instructions to be performed by the graphics processing system. The graphics processing system then displays the rendered primitives as part of a three-dimensional scene displayed in a two-dimensional display.

To help reduce the time needed to render primitives for a scene, the graphics processing system divides the scene into multiple tiles and renders the scene by tile. Further, the graphics processing system performs tile-based rendering for the primitives in a tile before performing pixel-based rendering of the primitives. However, performing pixel-based rendering of the primitives requires generating depth values for the primitives to be generated. Generating such depth values is time-consuming, increasing the total time needed to render the primitives and decreasing the efficiency of the graphics processing system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
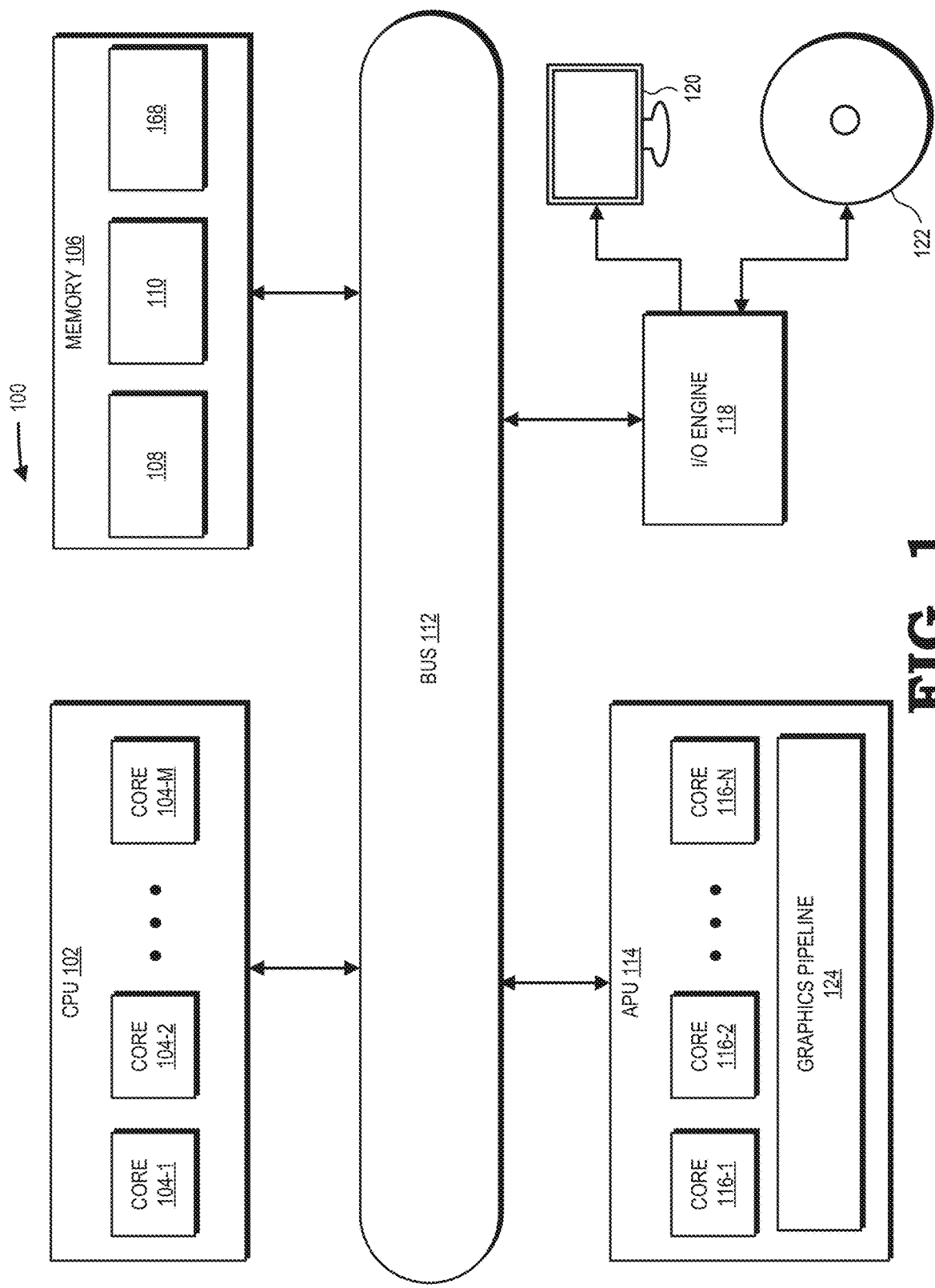
FIG. 1 is a block diagram of a processing system configured generate hierarchical depth data using primitive fusion, in accordance with some embodiments.

To help reduce the time needed for a processing system to render primitives of an image, a processing system performs coarse visibility compression by first generating and compressing visibility data for each visible primitive of the image and then using the compressed visibility data to render the primitives. To this end, the processing system (e.g., accelerated processing unit (APU), central processing unit (CPU), memory) first divides the image into two or more bins (e.g., coarse bins). The processing system then performs a visibility pass for the image by determining whether each primitive of the image is visible (e.g., present) in each bin of the image. In response to no primitives of a draw call being visible in a bin (e.g., coarse bin), the processing system generates visibility data indicating that the draw call is not visible in the bin and the primitives of the draw call should not be rendered for the bin. In response to a primitive being visible in the bin, the processing system generates visibility data indicating, for example, draw call data (e.g., draw call index data, number of primitives in a draw call) vertex data, shading data, positioning data, index data, or any combination thereof, associated with the primitive. Once visibility data is generated by the processing system, the processing system compresses the visibility data and stores the compressed visibility data in a buffer associated with the bin. The processing system next flushes the compressed visibility data from the buffer, for example, in response to the visibility pass being completed for the image (e.g., the processing system has determined whether each primitive is or is not visible in the bins of the image) and stores the flushed visibility data in a memory. The processing system then uses the flushed visibility data to perform tile-based rendering for the primitives in image, rendering the visible primitives in a first bin before moving on to a next bin. By using the compressed visibility data, the time to perform tile-based rendering on the primitives is reduced.

After tile-based rendering is performed for a primitive, the processing system performs pixel-based rendering for the primitive. To this end, techniques and systems described herein address reducing the time needed to perform pixel-based rendering. To reduce the time needed for pixel-based rendering, the processing system (e.g., APU, CPU) divides the image into two or more tiles and determines hierarchical depth data for the primitives of the image concurrently with the visibility pass of the image. Each tile, for example, includes a first number of pixels of the image in a first (e.g., horizontal direction) and a second number of pixel of the image in a second (e.g., vertical direction). Additionally, each bin of the image includes, for example, a first number of tiles in a first (e.g., horizontal) direction and a second number of tiles in a second (e.g., vertical direction). After diving the image into tiles, the processing system then primes a depth buffer using the determined hierarchical depth data. The hierarchical depth data includes, for example, depth data for a primitive at a tile level (e.g., the depth of the primitive at one or more pixels of the tile, an average depth of the primitive in the tile, a maximum depth of the tile, a minimum depth of the tile, or any combination thereof). To determine such hierarchical depth data for a primitive, the processing system uses primitive fusion for one or more tiles of the image. To this end, the processing system first determines the shared edges between the primitives of the image to be rendered. That is to say, the processing system determines the edges (e.g., lines) shared by two or more of the primitives of the image to be rendered. For example, the processing system determines lines shared by a first primitive on a first side of the line and a second primitive on a second, opposite side of the line. The processing system then determines the tile coverage for the first primitive of the primitives to be rendered. To determine the tile coverage of the first primitive, the processing system determines if the first primitive substantially covers each tile of the image (e.g., if the first primitive is visible or present in a predetermined threshold percentage of the tile). In response to the first primitive substantially covering the tile (e.g., the first primitive is visible or present in at least a predetermined threshold percentage of the tile), the processing system passes the depth data of the first primitive in the tile (e.g., hierarchical depth data) to a depth buffer and uses the depth data to prime the depth buffer. In response to the first primitive not substantially covering the tile (e.g., the first primitive is visible or present in less than a predetermined threshold percentage of the tile), the processing system determines if the first primitive shares an edge with another primitive to be rendered in the tile. If the first primitive does not share an edge with another primitive in the tile, the processing system rejects the depth data of that primitive in the tile, and, as such, does not pass the depth data on to the depth buffer. If the first primitive does share an edge with another primitive in the tile, the processing system stores the depth data (e.g., depth values) of the first primitive in the tile in an edge buffer.

After determining the tile coverage of the first primitive, the processing system then moves on to determining the tile coverage of a second primitive of the primitives to be rendered by determining if the second primitive covers a predetermined threshold percentage of each tile of the image. In response to the second primitive not covering the predetermined threshold percentage of a tile, the processing system determines if the second primitive shares an edge with a preceding primitive (e.g., a primitive that the processing system has already determined tile coverage). If the second primitive shares an edge with a preceding primitive (e.g., the first primitive), the processing system fuses the portion of the second primitive in the tile with the portion of the preceding primitive in the tile to generate a fused primitive. The processing system then determines if the second primitive (e.g., as fused with the first primitive) shares an edge with a successive primitive (e.g., a primitive of the primitives to be rendered that the processing system has not yet determined tile coverage). In response to the second primitive sharing an edge with a successive primitive, the processing system stores the depth data of the fused primitive in the edge buffer where it is available to be fused with one or more successive primitives to determine tile coverage and generate hierarchical depth data. In response to the second primitive not sharing an edge with a successive primitive, the processing system determines if the fused primitive substantially covers the tile and passes the depth data (e.g., hierarchical depth data) of the fused primitive to the depth buffer if the fused primitives does substantially cover the tile. For example, the processing system determines if the fused primitive substantially covers the tile by determining whether the fused primitive is valid in the tile based on one or more flags associated with the fused primitive (e.g., valid flags) and passes the depth data (e.g., depth values) of the fused primitive to the depth buffer if the fused primitive is valid in the tile. The depth data of the fused primitive stored in the depth buffer is then available for performing pixel-based rendering of the first and second primitives. By fusing primitives to determine tile coverage and generate hierarchical depth data, hierarchical depth data for multiple primitives to be rendered is made available for performing pixel-based rendering of those tiles. In this way, the time needed to perform pixel-based rendering of the primitives is reduced as at least a portion of the depth data needed to perform pixel-based rendering of the primitives is already available in the depth buffer.

While embodiments disclosed herein are discussed in the context of generating and using compressed visibility data to render one or more primitives at the frontend of a graphics pipeline, in other embodiments, the techniques and systems described herein are employed with using other data (e.g., original index data) to render one or more primitives at the frontend of a graphics pipeline.

FIG. 1 is a block diagram of a processing system 100 configured to prime a depth buffer using hierarchical depth data, according to some implementations. The processing system 100 includes or has access to a memory 106 or other storage component implemented using a non-transitory computer-readable medium, for example, a dynamic random-access memory (DRAM). However, in implementations, the memory 106 is implemented using other types of memory including, for example, static random-access memory (SRAM), nonvolatile RAM, and the like. According to implementations, the memory 106 includes an external memory implemented external to the processing units implemented in the processing system 100. The processing system 100 also includes a bus 112 to support communication between entities implemented in the processing system 100, such as the memory 106. Some implementations of the processing system 100 include other buses, bridges, switches, routers, and the like, which are not shown in FIG. 1 in the interest of clarity.

The techniques described herein are, in different implementations, employed at accelerated processing unit (APU) 114. APU 114 includes, for example, vector processors, coprocessors, graphics processing units (GPUs), general-purpose GPUs (GPGPUs), non-scalar processors, highly parallel processors, artificial intelligence (AI) processors, inference engines, machine learning processors, other multithreaded processing units, scalar processors, serial processors, or any combination thereof. The APU 114 renders images according to one or more applications 110 for presentation on a display 120. For example, the APU 114 renders objects (e.g., textures) to produce values of pixels that are provided to the display 120, which uses the pixel values to display an image that represents the rendered objects. To render the objects, the APU 114 implements a plurality of processor cores 116-1 to 116-N that execute instructions concurrently or in parallel. For example, the APU 114 executes instructions from a graphics pipeline 124 using a plurality of processor cores 116 to render one or more textures. According to implementations, one or more processor cores 116 operate as SIMD units that perform the same operation on different data sets. Though in the example implementation illustrated in FIG. 1, three cores (116-1, 116-2, 116-N) are presented representing an N number of cores, the number of processor cores 116 implemented in the APU 114 is a matter of design choice. As such, in other implementations, the APU 114 can include any number of cores 116. Some implementations of the APU 114 are used for general-purpose computing. The APU 114 executes instructions such as program code 108 for one or more applications 110 stored in the memory 106 and the APU 114 stores information in the memory 106 such as the results of the executed instructions.

The processing system 100 also includes a central processing unit (CPU) 102 that is connected to the bus 112 and therefore communicates with the APU 114 and the memory 106 via the bus 112. The CPU 102 implements a plurality of processor cores 104-1 to 104-N that execute instructions concurrently or in parallel. In implementations, one or more of the processor cores 104 operate as SIMD units that perform the same operation on different data sets. Though in the example implementation illustrated in FIG. 1, three cores (104-1, 104-2, 104-M) are presented representing an M number of cores, the number of processor cores 104 implemented in the CPU 102 is a matter of design choice. As such, in other implementations, the CPU 102 can include any number of cores 104. In some implementations, the CPU 102 and APU 114 have an equal number of cores 104, 116 while in other implementations, the CPU 102 and APU 114 have a different number of cores 104, 116. The processor cores 104 execute instructions such as program code 108 for one or more applications 110 stored in the memory 106 and the CPU 102 stores information in the memory 106 such as the results of the executed instructions. The CPU 102 is also able to initiate graphics processing by issuing draw calls to the APU 114. In implementations, the CPU 102 implements multiple processor cores (not shown in FIG. 1 in the interest of clarity) that execute instructions concurrently or in parallel.

In embodiments, the APU 114 is configured to render one or more objects (e.g., textures) for an image to be rendered according to a graphics pipeline 124. A graphics pipeline 124 includes, for example, one or more steps, stages, or instructions to be performed by APU 114 in order to render one or more objects for an image to be rendered. For example, a graphics pipeline 124 includes data indicating an assembler stage, vertex shader stage, hull shader stage, tessellator stage, domain shader stage, geometry shader stage, binner stage, hierarchical-z stage, rasterizer stage, pixel shader stage, and output merger stage to be performed by APU 114 in order to render one or more textures. According to embodiments, graphics pipeline 124 has a frontend that includes one or more stages of graphics pipeline 124 and a backend including one or more other stages of graphics pipeline 124. As an example, graphics pipeline 124 has a frontend including one or more stages associated with tile-based (e.g., bin-based) rendering (e.g., assembler stage, vertex shader stage, hull shader stage, tessellator stage, domain shader stage, geometry shader stage, binner stage, hierarchical-z stage) and a backend including one or more stages associated with pixel-based rendering (e.g., rasterizer stage, pixel shader stage, output merger stage). In embodiments, APU 114 is configured to perform at least a portion of the frontend of graphics pipeline 124 concurrently with at least a portion of the backend of graphics pipeline 124. For example, APU 114 is configured to perform one or more stages of a frontend of graphics pipeline 124 associated with tile-based rendering currently with one or more stages of a backend of graphics pipeline 124 associated with pixel-based rendering.

To render one or more objects, APU 114 uses original index data 168 when executing at least a portion of graphics pipeline 124. For example, APU 114 uses original index data 168 when executing the frontend of graphics pipeline 124 that includes stages associated with tile-based rendering. Original index data 168 includes, for example, data representing vertices of one or more primitives of an object (e.g., texture) to be rendered by APU 114. In embodiments, APU 114 is configured to use original index data 168 to assemble, position, shade, or any combination thereof, one or more primitives according to graphics pipeline 124. To help increase the performance of the frontend of graphics pipeline 124, processing system 100 compresses index data before it is used by APU 114 to assemble, position, or shade one or more primitives. As an example, before APU 114 is configured to execute at least a portion of graphics pipeline 124, APU 114 is configured to perform a visibility pass to compress index data. A visibility pass includes, for example, first dividing an image to be rendered into one or more bins (e.g., coarse bins). Each bin, for example, includes a first number of pixels of the image to be rendered in a first direction (e.g., horizontal direction) and a second number of pixels of the image to be rendered in a second direction (e.g., vertical direction). Additionally, in embodiments, each bin includes a first number of tiles of the image to be rendered in a first direction and a second number of tiles of the image to be rendered in a second direction After the image is divided into bins, the visibility pass includes APU 114 determining a number of primitives to be rendered. For example, APU 114 determines a number of primitives to be rendered based on a command stream indicating a batch of draw calls received by an application 110. For each primitive determined from the command stream, APU 114 performs one or more stages of the frontend of graphics pipeline 124. As an example, APU 114 performs an assembler stage and one or more shader stages for a primitive determined from a command stream. After one or more stages of the frontend of graphics pipeline 124 are performed for one or more primitives determined from the command stream, APU 114 then determines if each primitive is present (e.g., visible) in the bins (e.g., coarse bins) of the image and provides visibility data for each primitive to a respective memory (e.g., a buffer). For example, in response to determining that at least a portion of a primitive is present (e.g., visible) in a first bin, APU 114 provides visibility data indicating draw call data (e.g., draw call index, number of primitives in a draw call), vertex data, shading data, positioning data, index data, or any combination thereof, associated with the primitive to a respective buffer (e.g., a buffer associated with the first bin). Additionally, in response to determining that no primitives of a draw call are present (e.g., visible) in the first bin, APU 114 provides visibility data indicating the draw call is not visible in the first bin and that no primitives of the draw call are to be rendered in the first bin.

According to embodiments, CPU 102, APU 114, or both are configured to compress visibility data before it is stored in a respective buffer. For example, CPU 102, APU 114, or both are configured to compress data relating to the vertices (e.g., positioning data, shading data) of a primitive visible in a first tile before the data relating to the vertices is stored in a buffer. In embodiments, CPU 102, APU 114, or both are configured to flush visibility data out of a buffer in response to a threshold event. Such threshold events include, for example, a predetermined period of time (e.g., nanoseconds, milliseconds, seconds, minutes) elapsing, APU 114 completing a visibility pass for the image, or both. CPU 102, APU 114, or both flush visibility data out of a buffer into memory 106, for example, such that the flushed visibility data is available as compressed index data for the frontend of graphics pipeline 124. That is to say, APU 114 is configured to use visibility data flushed from a buffer into memory 106 as compressed index data instead of original index data 168 when performing one or more stages of graphics pipeline 124. After APU 114 has completed the visibility pass for the image and visibility data has been flushed from one or more buffers, APU 114 is configured to render the visible primitives in each bin (e.g., coarse bin) using the compressed index data (e.g., flushed visibility data) and according to graphics pipeline 124. As an example, after completing the visibility pass for the image and flushing the buffers of visibility data, APU 114 renders primitives in a first bin (e.g., coarse bin) using compressed index data and according to the stages of graphics pipeline 124. Once all the primitives in the first bin are rendered, APU 114 renders primitives, for example, in a next bin (e.g., second coarse bin) using compressed index data and according to the stages of graphics pipeline 124. APU 114 renders primitives by bin (e.g., coarse bin) until the visible primitives in each bin are rendered.

In embodiments, APU 114 is further configured to help reduce the time needed to render primitives at the backend of graphics pipeline 124. That is to say, APU 114 is configured to help reduce the time needed to perform pixel-based rendering on primitives. To this end, APU 114 is configured to generate hierarchical depth data for an image using primitive fusion concurrently with performing the visibility passes of the image and to use the generated hierarchical depth data to prime a depth buffer (e.g., store the generated hierarchical depth data in the depth buffer so that it is available for pixel-based rendering of primitives). Hierarchical depth data includes, for example, data (e.g., values) relating to the depth of one or more primitives in one or more tiles of an image. That is to say, hierarchical depth data includes depth data for primitives at a tile level. In embodiments, hierarchical depth data includes, for example, a flag (e.g., valid flag) indicating one or more primitives are valid in a tile (e.g., include no non-shared edges or vertices in a tile), the depth of the primitives at one or more pixels of the tile, an average depth of the primitives in the tile, maximum depths of the primitives in tile, minimum depths of the primitives in the tile, or any combination thereof. To generate such hierarchical depth data using primitive fusion, APU 114 first identifies one or more primitives for an image to be rendered from a command stream received, for example, from an application 110. From these primitives, APU 114 determines one or more shared edges between the primitives (e.g., APU 114 determines which primitives share edges with one another), one or more unshared edges (e.g., APU 114 determines which primitives are defined by an edge not shared with another primitive), or both. For example, APU 114 determines which lines of the image define a first primitive on a first side of the line and a second primitive on a second, opposite side of the line. After APU 114 divides the image into one or more tiles, APU 114 then determines hierarchical depth data for one or more primitives identified in the command stream using primitive fusion. For example, for a first primitive identified in the command stream, APU 114 determines the tile coverage of the first primitive by determining whether the first primitive substantially covers (e.g., is present or visible in a predetermined threshold percentage of) each tile of the image. That is to say, for each tile of an image to be rendered, APU 114 determines if a first primitive covers (e.g., is present or visible in) at least a predetermined threshold percentage of the tile.

In response to the first primitive covering at least predetermined threshold percentage of a tile, APU 114 passes the depth data (e.g., depth values) of the primitive in the tile (e.g., hierarchical depth data) to a depth buffer where it is made available to perform pixel-based rendering for the first primitive. In response to the first primitive not covering the predetermined threshold percentage of the tile, APU 114 determines if the first primitive is valid in the tile. To determine is the first primitive is value, APU 114 determines if the primitive includes a non-shared edge in the tile (e.g., if the first primitive is defined by line in the tile not used to define another primitive), includes an endpoint of an edge (e.g., vertex) in the tile, or both. If the first primitive does include a non-shared edge, endpoint of an edge (e.g., vertex), or both in the tile, APU 114 flags the first primitive as invalid in the tile. If the first primitive does not include a non-shared edge, endpoint of an edge, or both, APU 114 flags the first primitive as valid in the tile. After determining if the first primitive is valid, APU 114 determines whether the first primitive shares an edge with another of the primitives to be rendered in that tile. If the first primitive does not share an edge with another primitive to be rendered in the tile, APU 114 rejects the depth data of the primitive in the tile and, as such, does not pass the depth data to the depth buffer. If the first primitive does share an edge with another primitive to be rendered in the tile, APU 114 stores the flag (e.g., valid flag) indicating whether the first primitive is valid in the tile, the depth data of the first primitive in the tile, or both in an edge buffer (e.g., a first in, first out (FIFO) buffer) where it is made available for primitive fusion. To perform primitive fusion, after determining the tile coverage of the first primitive (e.g., after APU 114 has determined whether the first primitive substantially covers every tile of the image), APU 114 determines the tile coverage of a second primitive to be rendered by determining whether the second primitive substantially covers (e.g., is present or visible in a predetermined threshold percentage of) each tile of the image. In response to the second primitive covering a predetermined threshold percentage of a tile, APU 114 passes the hierarchical depth data of the second primitive in the tile to the depth buffer where is it made available for pixel-based rendering of the second primitive. In response to the second primitive not covering a predetermined threshold percentage of the tile, APU 114 determines whether the second primitive shares an edge with a preceding primitive (e.g., a primitive that APU 114 has already determined tile coverage for) in the tile. For example, APU 114 determines whether the second primitive shares an edge with the first primitive (e.g., a preceding primitive) in the tile. If the second primitive does not share an edge with a preceding primitive in the tile, APU 114 then determines if the second primitive shares an edge with a successive primitive (e.g., a primitive the APU has yet to determine tile coverage for) in the tile. In response to the second primitive not sharing an edge with a successive primitive in the tile, APU 114 rejects the depth data of the second primitive in the tile and, as such, does not pass the depth data of the second primitive in the tile to the depth buffer. Further, in response to the second primitive sharing an edge with a successive primitive in the tile, APU 114 stores a flag (e.g., valid flag) indicating whether the second primitive is valid in the tile (e.g., whether the second primitive includes a non-shared edge or vertex in the tile), the depth data (e.g., depth values) of the second primitive in the tile, or both in an edge buffer where it is made available for later primitive fusion.

If the second primitive does share an edge with a preceding primitive in the tile, APU 114 fuses at least a portion of the preceding primitive in the tile with at least a portion of the second primitive in the tile to generate a fused primitive. For example, APU 114 fuses the portion of the second primitive in the tile with depth data (e.g., depth values) and valid flag of the preceding primitive (e.g., first primitive) stored in an edge buffer. APU 114 fuses the portion of the preceding primitive in the tile with the portion of the second primitive in the tile by, for example, calculating depth data for the fused primitives based on the depth data of the first and second primitives in the tile (e.g., adding the depth values of the preceding primitive and the second primitive in the tile, averaging the depth values of the preceding primitive and the second primitive in the tile, determining maximum depth values, determining minimum depth values), combining valid flags together, performing one or more logic operations (e.g., binary logic operations), or any combination thereof. After fusing at least a portion of the preceding primitive in the tile with at least a portion of the second primitive in the tile to generate a fused primitive, APU 114 determines if the second primitive shares an edge with a successive primitive to be rendered in the tile (e.g., a primitive that APU 114 has not yet determined tile coverage for). If the second primitive does not share an edge with a successive primitive in the tile, APU 114 determines whether the fused primitive covers the predetermined threshold percentage of the tile by, for example, determining whether the fused primitive is valid in the tile. For example, based on one or more valid flags of the fused primitive, APU 114 determines if the fused primitive includes one or more flags indicating a primitive used to form the fused primitive is invalid in the tile. In response to the fused primitive being valid in the tile (e.g., the fused primitive includes no flags indicating a primitive used to form the fused primitive is invalid in the tile), APU 114 passes the hierarchical depth data of the fused primitive in the tile (e.g., the depth values of the fused primitive in the tile) to the depth buffer where it is made available to perform pixel-based rendering for the preceding primitive and the second primitive. In response to the fused primitive not being valid in the tile (e.g., the fused primitive includes one or more flags indicating a primitive used to form the fused primitive is invalid in the tile), APU 114 rejects the depth data of the fused primitive and, as such, does not pass the depth data of the fused primitive on to the depth buffer.

If the second primitive does share an edge with a successive primitive in the tile, APU 114 stores a flag (e.g., valid flag) indicating whether the fused primitive is valid in the tile and the depth data (e.g., depth values) of the fused primitive in an edge buffer where it is made available for later primitive fusion. For example, in response to a third primitive not covering a predetermined threshold percentage of the tile, APU 114 determines if the third primitive shares an edge with a preceding primitive (e.g., the second primitive). In response to the third primitive sharing an edge with the preceding primitive (e.g., the second primitive), APU 114 fuses at least a portion of the third primitive with at least a portion of the fused primitive (e.g., the second primitive as fused with the first primitive) to generate a second fused primitive. For example, APU 114 fuses the portion of the third primitive in the tile with the valid flag and depth data of the fused primitive in the tile stored in the edge buffer to generate a second fused primitive. APU 114 then determines the tile coverage of the second fused primitive by, for example, determining whether the second fused primitive is valid as described above. In this way, APU 114 fuses together one or more primitives to determine tile coverage and generate hierarchical depth data for the primitives to be rendered. As the hierarchical depth data of the primitives generated using primitive fusion is made available in the depth buffer for performing pixel-based rendering, the time needed to perform pixel-based rendering of the primitives at the backend of graphics pipeline 124 is reduced.

An input/output (I/O) engine 118 includes hardware and software to handle input or output operations associated with the display 120, as well as other elements of the processing system 100 such as keyboards, mice, printers, external disks, and the like. The I/O engine 118 is coupled to the bus 112 so that the I/O engine 118 communicates with the memory 106, the APU 114, or the CPU 102. In the illustrated implementation, the I/O engine 118 reads information stored on an external storage component 122, which is implemented using a non-transitory computer-readable medium such as a compact disk (CD), a digital video disc (DVD), and the like. The I/O engine 118 is also able to write information to the external storage component 122, such as the results of processing by the APU 114 or the CPU 102.

Figure 2:
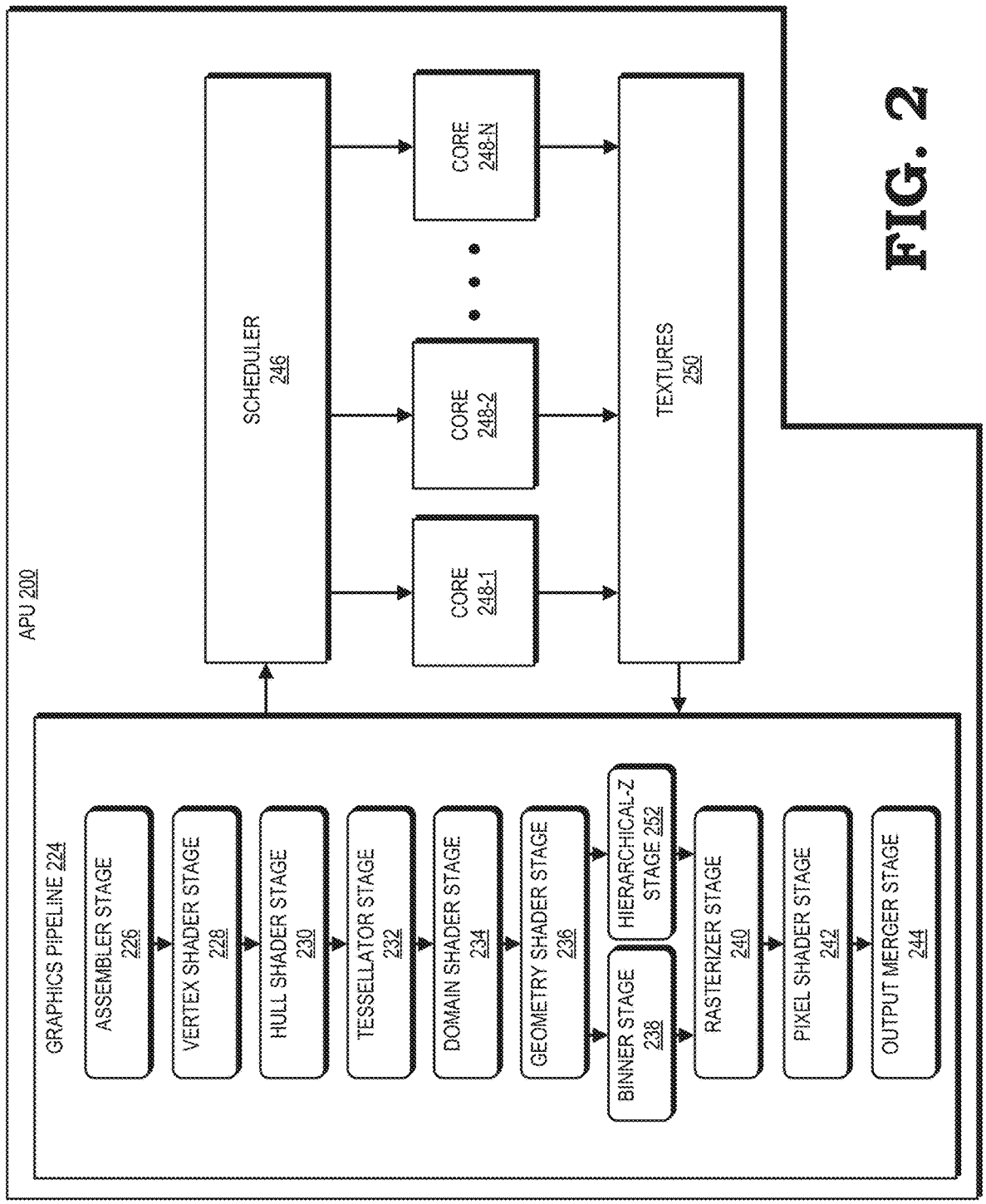
FIG. 2 is a block diagram of an accelerated processing unit configured to implement a graphics pipeline including hierarchical depth data generation using primitive fusion, in accordance with some embodiments.

Referring now to FIG. 2, an APU 200 configured to implement a graphics pipeline including hierarchical depth data generation is presented. In embodiments, APU, 200 similar to or the same as APU 114, is configured to render one or more textures 250 based on command stream received from an application 110 and including data for an image to be rendered. For example, a command stream includes data indicating one or more primitives to be rendered for the image. To render the image indicated in the command stream, APU 200 is configured to render one or more primitives according to graphics pipeline 224, similar to or the same as graphics pipeline 124. Graphics pipeline 224 includes one or more steps, stages, or instructions to be performed by APU 200 in order to render one or more objects for an image to be rendered, for example, assembler stage 226, vertex shader stage 228, hull shader stage 230, tessellator stage 232, domain shader stage 234, geometry shader stage 236, binner stage 238, hierarchical-z stage 252, rasterizer stage 240, pixel shader stage 242, output merger stage 244, or any combination thereof.

Assembler stage 226 includes, for example, data and instructions for APU 200 to read and organize primitive data from a memory (e.g., memory 106), application 110, command stream, or any combination thereof, into one or more primitives to be rendered by the rest of graphics pipeline 224. Vertex shader stage 228 includes, for example, data and instructions for APU 200 to perform one or more operations on the primitives generated by assembler stage 226. Such operations include, for example, transformations (e.g., coordinate transformations, modeling transformations, viewing transformations, projection transformations, viewpoint transformations), skinning, morphing, and lighting operations. Hull shader stage 230, tessellator stage 232, and domain shader stage 234 together include, for example, data and instructions for APU 200 to implement tessellation for the primitives modified by vertex shader stage 228. Geometry shader stage 236 includes, for example, data and instructions for APU 200 to perform vertex operations on the tessellated primitives. Such vertex operations include, for example, point sprint expansion, dynamic particle system operations, fur-fin generation, shadow volume generation, single pass render-to-cubemap, per-primitive material swapping, and per-primitive material setup. Binner stage 238 includes, for example, data and instructions for APU 200 to perform coarse rasterization to determine if a bin (e.g., coarse bin) of an image overlaps with one or more primitives (e.g., primitives modified by vertex shader stage 228). That is to say, binner stage 238 includes data and instructions for APU 200 to determine which primitives are present (e.g., visible) in a bin of an image. Hierarchical-z stage 252 includes data and instructions for APU 200 to generate depth data for each primitive at a tile level (e.g., hierarchical depth data) using primitive fusion and prime a depth buffer with the generated depth data. Rasterization stage 240 includes, for example, data and instructions for APU 200 to determine which pixels are included in each primitive and convert each primitive into pixels of the image. Pixel shader stage 242 includes, for example, data and instructions for APU 200 to determine the output values for the pixels determined during rasterization stage 240. Output merger stage 244 includes, for example, data and instructions for APU 200 to merge the output values of the pixels using, for example, z-testing and alpha blending.

According to embodiments, each instruction of a stage of graphics pipeline 224 is performed by one or more cores 248, similar to or the same as cores 116, of APU 200. Though the example embodiment illustrated in FIG. 2 presents APU 200 having three cores (248-1, 248-2, 248-N) representing an N number of cores, in other embodiments, APU 200 may have any number of cores. Each instruction of graphics pipeline 224 is scheduled for execution by one or more cores 248 by scheduler 246. Scheduler 246 includes, for example, hardware and software configured to schedule tasks and instructions for the cores 248 of APU 200. In this way, two or more stages of graphics pipeline 224 are performed concurrently. In embodiments, graphics pipeline 224 includes a frontend that includes one or more stages of graphics pipeline 224 and a backend that includes one or more other stages of graphics pipeline 224. For example, graphics pipeline 224 includes a frontend that includes stages relating to tile-based (e.g., coarse tile-based) rendering (e.g., assembler stage 226, vertex shader stage 228, hull shader stage 230, tessellator stage 232, domain shader stage 234, geometry shader stage 236, binner stage 238, hierarchical-z stage 252) and a backend that includes stages relating to pixel-based rendering (e.g., rasterization stage 240, pixel shader stage 242, output merger stage 244). In embodiments, APU 200 is configured to perform one or more stages of the frontend of graphics pipeline 224 concurrently with one or more stages of the backend of graphics pipeline 224.

Figure 3:
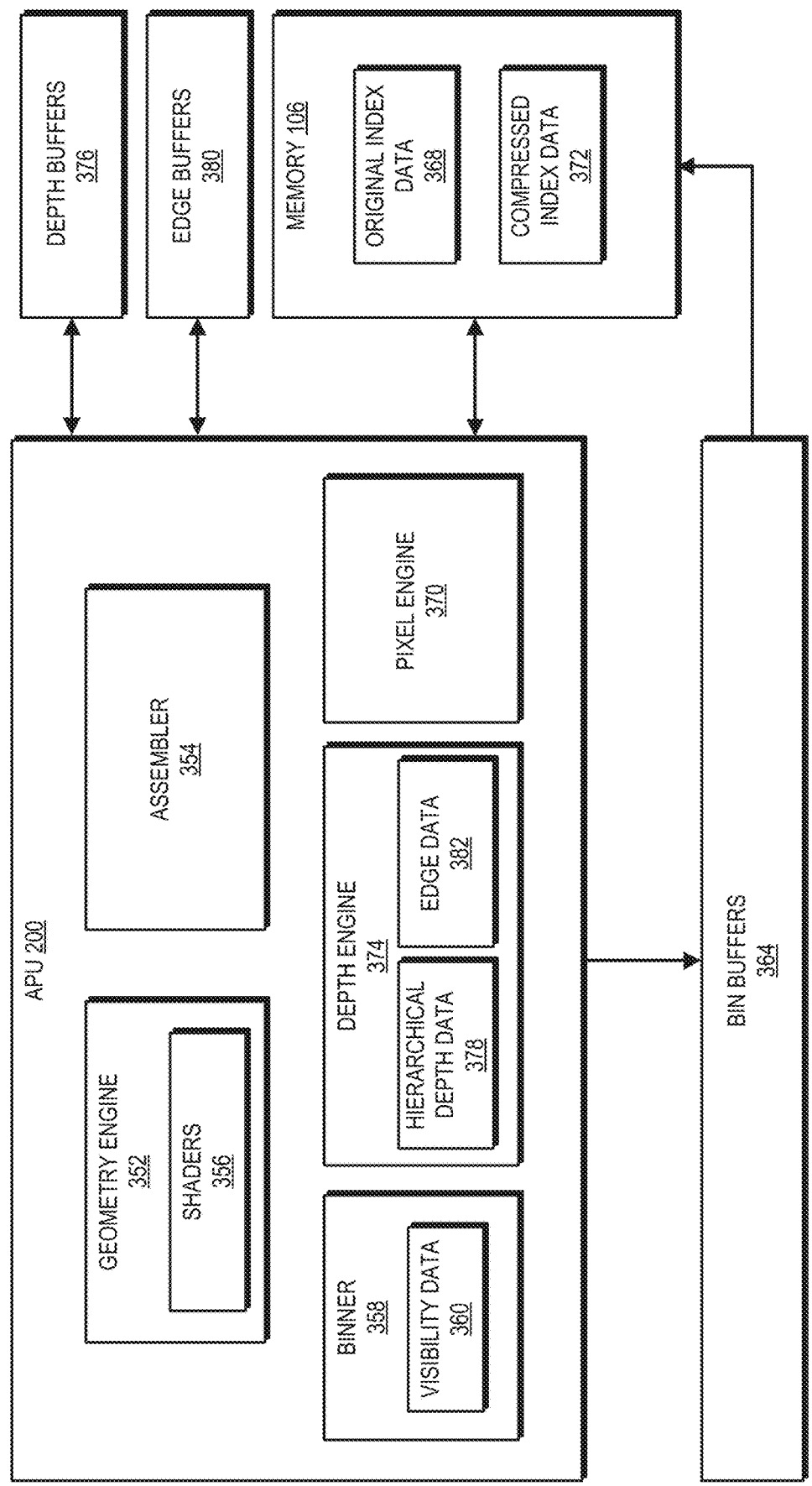
FIG. 3 is a block diagram of an accelerated processing unit configured to generate hierarchical depth data using primitive fusion, in accordance with some embodiments.

Referring now to FIG. 3, APU 200 configured to generate hierarchical depth data using primitive fusion is presented. In embodiments, APU 200 is configured to generate one or more textures 250 according to graphics pipeline 224. To this end, APU 200 includes assembler 354, geometry engine 352, shaders 356, binner 358, and depth engine 374. Assembler 354 includes, for example, hardware and software-based circuitry configured to implement one or more instructions from, for example, assembler stage 226 of graphics pipeline 224. That is to say, assembler 354 includes hardware and software-based circuitry configured to read and organize primitive data from a memory (e.g., memory 106), application 110, command stream, or any combination thereof into one or more primitives to be rendered. In embodiments, assembler 354 includes hardware and software-based circuitry configured to read and organize data output by one or more stages of graphics pipeline 224 such that the data is usable by one or more other stages of graphics pipeline 224. For example, assembler 354 is configured to read and organize data output by geometry shader stage 236 such that the data is usable by binner stage 238. Geometry engine 352 includes hardware and software-based circuitry to implement one or more instructions from one or more stages of the frontend of graphics pipeline 224, for example, vertex shader stage 228, hull shader stage 230, tessellator stage 232, domain shader stage 234, and geometry shader stage 236. As an example, geometry engine 352 includes one or more hardware and software shaders 356 configured to implement one or more instructions from one or more stages of the frontend of graphics pipeline 224. Binner 358 includes hardware and software-based circuitry configured to perform one or more visibility passes for images, one or more instructions from binner stage 238, or both. For example, binner 358 is configured to determine whether one or more primitives are visible in a bin (e.g., coarse bin) and to store visibility data 360 indicating, for example, draw call data, vertex data, shading data, positioning data, index data, or any combination associated with the visible primitives in a respective bin buffer 364. Depth engine 374 includes hardware and software-based circuitry configured to determine hierarchical depth data (e.g., depth data at a tile-level) for one or more primitives using primitive fusion, perform one or more instructions from hierarchical-z stage 252, or both. For example, depth engine 374 is configured to determine edge data 382 that includes, for example, data representing the shared edges (e.g., shared lines) between primitives of a plurality of primitives to be rendered. Based on the shared edges, depth engine 374 then stores depth data of one or more primitives in one or more tiles in one or more edge buffers 380 (e.g., FIFO buffers). From the depth data of the primitives stored in the edge buffers 380, depth engine 374 generates one or more fused primitives. Depth engine 374 then determines hierarchical depth data 378 (e.g., tile-level depth data) for one or more primitives, fused primitives, or both by determining whether the primitives cover at least a predetermined threshold percentage (e.g., completely cover) of one or more tiles of the image, whether fused primitives are valid in a tile, or both. Depth engine 374 then stores the generated hierarchical depth data 378 in one or more depth buffers 376. Pixel engine 370 includes hardware and software-based circuitry configured to implement one or more instructions from one or more stages of the backend of graphics pipeline 224 (e.g., rasterizer stage 240, pixel shader stage 242, and output merger stage 244) using, for example, the hierarchical depth data 378 stored in depth buffers 376.

According to embodiments, APU 200 is configured to concurrently perform one or more instructions associated with a frontend of graphics pipeline 224 and one or more instructions associated with a backend of graphics pipeline 224. For example, assembler 354, geometry engine 352, binner 358, or any combination thereof are configured to perform one or more tile-based rending instructions associated with a frontend of graphics pipeline 224 (e.g., assembler stage 226, vertex shader stage 228, hull shader stage 230, tessellator stage 232, domain shader stage 234, geometry shader stage 236, binner stage 238) for primitives in a first tile (e.g., bin) and pixel engine 370 is configured to perform one or more pixel-based rendering instructions associated with a backend of graphics pipeline 224 (e.g., rasterizer stage 240, pixel shader stage 242, output merger stage 244) for pixels in the first tile, a different second tile, or both.

In embodiments, geometry engine 352 is configured to implement instructions from the frontend of graphics pipeline 224 using original index data 368 that includes, for example, data representing vertices of one or more primitives of a texture 250 to be rendered by APU 114 (e.g., pointers to a vertex buffer). To help reduce the amount of time needed for geometry engine 352 to implement instructions from the frontend of graphics pipeline 224, APU 200 is configured to generate compressed index data 372 that includes, for example, compressed data representing vertices of one or more primitives of a texture 250 to be rendered by APU 200. To this end, APU 200 is configured to receive a command stream from application 110 that indicates an image to be rendered. For example, the command stream indicates a batch of draw calls identifying one or more primitives to be rendered for an image. In response to receiving the command stream, assembler 354, geometry engine 352, or both are configured to perform instructions for one or more stages of the frontend of graphics pipeline 224 to generate one or more primitives. For example, assembler 354 is configured to implement instructions from assembler stage 226 and geometry engine 352 is configured to implement instructions from vertex shader stage 228, hull shader stage 230, tessellator stage 232, domain shader stage 234, geometry shader stage 236, or any combination thereof to generate one or more primitives. Binner 358 is then configured to divide the image into two or more bins (e.g., coarse bins) and to perform a visibility pass for the image to generate visibility data for each bin. That is to say, binner 358 determines which draw calls indicated in command stream 405, primitives generated by assembler 354 and geometry engine 352, or both are visible (e.g., present) in each bin (e.g., coarse bin).

Based on the visibility pass for the image, binner 358 is configured to generate visibility data 360 associated with the bins (e.g., coarse bins) and store the visibility data 360 in a respective bin buffer 364. For example, during the visibility pass, in response to determining that no primitives of a draw call are visible (e.g., present) in a first bin (e.g., coarse bin), binner 358 is configured to provide visibility data 360 (e.g., a flag) to a respective bin buffer 364 (e.g., a bin buffer 364 associated with the first bin) indicating that the draw call is not visible in the first bin and that no primitives of the draw call are to be rendered in the first bin. Additionally, in response to determining a primitive is visible (e.g., present) in the first bin, binner 358 is configured to provide visibility data 360 to the respective bin buffer 364 indicating draw call data (e.g., draw call index data, number of primitives in a draw call), vertex data, shading data, positioning data, index data, or any combination thereof associated with the primitive. According to embodiments, binner 358 is configured to compress visibility data 360 before is provided and stored in bin buffers 364. In embodiments, APU 200, CPU 102, or both are configured to flush compressed visibility data 360 from bin buffers 364 into memory 106 in response to a threshold event. Such threshold events include, for example, a predetermined period of time (e.g., nanoseconds, milliseconds, seconds, minutes) elapsing, APU 200 completing the visibility pass for bins of the image, or both. For example, in response to completing the visibility pass for the image, APU 200 is configured to flush compressed visibility data 360 from a bin buffer 364 into memory 106.

In embodiments, compressed visibility data 360 flushed from bin buffers 364 into memory 106 is available as compressed index data 372. That is to say, assembler 354, geometry engine 352, or both are configured to use compressed index data 372 to render one or more primitives of an image. Compressed index data 372 includes, for example, data representing vertices of one or more primitives of an image to be rendered by APU 200. In embodiments, APU 200 is configured to render an image according to an ordering of one or more bins (e.g., coarse bins) and the respective visibility data 360 associated with bins. For example, APU 200 is configured to render each primitive that is visible in a first bin of an image based on visibility data 360 (e.g., based on compressed index data 372 after visibility data 360 is flushed from a bin buffer 364). In response to rendering each primitive visible (e.g., present) in a first bin, APU 200 is configured to render the primitives visible in a next bin (e.g., an adjacent bin to the first bin). According to embodiments, APU 200 is configured to perform tile-based rendering (e.g., the frontend of graphics pipeline 224) for the primitives in a first bin concurrently with performing pixel-based rendering (e.g., the backend of graphics pipeline 224) for primitives in a second, different bin. For example, APU 200 concurrently performs tile-based rendering for primitives in a first bin and pixel-based rendering for primitives in a second bin where tile-based rendering has already been completed. By concurrently performing tile-based rendering and pixel-based rendering for primitives of different bins, the time needed to render an image is reduced.

To help reduce the amount of time needed for pixel engine 370 to implement instructions from the backend of graphics pipeline 224, depth engine 374 is configured to generate hierarchical depth data 378 (e.g., depth data for one or more primitives at a tile level of the image) using primitive fusion concurrently with a visibility pass performed by binner 358. To this end, depth engine 374 first determines edge data 382 of primitives to be rendered for an image indicated, for example, in a command stream received from an application 110. Edge data 382 represents, for example, the shared edges (e.g., lines) of the image that each define two or more primitives in one or more tiles, non-shared edges (e.g., lines) of the image that define only one primitive in one or more tiles, or both. As an example, edge data 382 includes lines shared by a first primitive on a first side of the line and a second primitive on a second, opposite side of the line (e.g., shared edges), lines that only define one primitive (non-shared edges), or both. Next, depth engine 374 determines the tile coverage of a first primitive of the primitives to be rendered by determining whether the first primitive substantially covers each tile of the image to be rendered. For example, for each tile of the image, depth engine 374 determines whether the first primitive covers at least a predetermined threshold percentage of (e.g., whether the first primitive is visible in a predetermined threshold percentage of) the tile. In response to the first primitive covering at least the predetermined threshold percentage of the tile, depth engine 374 stores the hierarchical depth data 378 of the first primitive in the tile to one or more depth buffers 376. The hierarchical depth data 378 includes, for example, a flag (e.g., valid flag) indicating the first primitive is valid in the tile, the depth values of the first primitive at one or more pixels of the tile, an average depth of the first primitive in the tile, or both. In response to the first primitive not covering at least the predetermined threshold percentage of the tile, depth engine 374 determines if the first primitive is valid in the tile. To determine if the first primitive is valid in the tile, depth engine 374 determines whether the first primitive includes a non-shared edge in the tile (e.g., if the first primitive is defined by a line in the tile not used to define another primitive to be rendered), an endpoint of an edge (e.g., vertex) in the tile, or both based on, for example, edge data 382. In response to determining the first primitive is invalid in the tile (e.g., the first primitive includes a non-shared edge or endpoint of an edge in the tile), depth engine 374 generates a flag (e.g., valid flag) indicating the first primitive is invalid in the tile. In response to the first primitive being valid in the tile (e.g., the first primitive includes no non-shared edges or endpoints of edges), depth engine 374 generates a flag (e.g., valid flag) indicating the first primitive is valid in the tile. Next, depth engine 374 determines whether the first primitive shares an edge with another primitive to be rendered (e.g., shares a line that defines the first primitive and another primitive to be rendered), based on, for example, edge data 382. If the first primitive does not share an edge with another primitive, depth engine 374 rejects the depth data of the first primitive in the tile and, as such, does not pass the depth data on to depth buffers 376. If the first primitive does share an edge with another primitive, the depth data of the first primitive in the tile (e.g., hierarchical depth data 378), one or more valid flags associated with the first primitive in the tile, or both are stored in one or more edge buffers 380 where they are made available for later primitive fusion.

After determining the tile coverage of the first primitive (e.g., determining whether the first primitive substantially covers each tile of an image), depth engine 374 determines the tile coverage for a second primitive of the primitives to be rendered. To this end, depth engine 374 determines whether the second primitive covers a predetermined threshold percentage of each tile of the image to be rendered. In response to the second primitive covering at least the predetermined threshold percentage of a tile, depth engine 374 passes the hierarchical depth data 378 of the second primitive in the tile to a depth buffer 376. In response to the second primitive not covering at least the predetermined threshold percentage of the tile, depth engine 374 determines whether the second primitive shares an edge with a preceding primitive of the primitives to be rendered in the (e.g., a primitive that depth engine 374 has already determined tile coverage), based on, for example, edge data 382. For example, depth engine 374 determines whether edge data 382 indicates the second primitive shares an edge with a preceding primitive in the tile. In response to the second primitive not sharing an edge with a preceding primitive in the tile, depth engine 374 then determines whether the second primitive shares an edge with a successive primitive (e.g., a primitive that depth engine 374 has not yet determined tile coverage) in the tile. If the second primitive does not share an edge with a successive primitive in the tile, depth engine 374 rejects the depth data of the second primitive in the tile and, as such, does not pass the depth data on to a depth buffer 376. If the second primitive does share an edge with a successive primitive in the tile, depth engine 374 stores a flag (e.g., valid flag) indicating whether the second primitive is valid in the tile (e.g., whether the second primitives includes a non-shared edge or endpoint of an edge in the tile), the depth data (e.g., hierarchical depth data 378) of the second primitive in the tile, or both in an edge buffer 380 where it is made available for primitive fusion. In response to the second primitive sharing an edge with the preceding primitive (e.g., first primitive), depth engine 374 fuses at least a portion of the second primitive with at least a portion of the preceding primitive to generate a fused primitive. As an example, in response to the second primitive sharing an edge in the tile, depth engine 374 fuses the depth data (e.g., depth values) of the portion of the second primitive in the tile with the depth data of the portion of the first primitive in the tile, the valid flags of the second primitive in the tile with valid flags of the first primitives in the tile, or both to generate a fused primitive. Depth engine 374 fuses two or more primitives in a tile, for example, by adding the depth values of the primitives in the tile together, averaging the depth values of the primitives in the tile together, determining minimum depth values in the tile, determining maximum depth values in the tile, combining valid flags, performing one or more logic operations (e.g., binary logic operations), or any combination thereof.

Depth engine 374 then determines whether the second primitive shares an edge with a successive primitive (e.g., a primitive that the processing system has not yet determined tile coverage) in the tile. If the second primitive does not share an edge with a successive primitive in the tile, depth engine 374 determines whether the fused primitive is valid in the tile based on one or more valid flags associated with the fused primitive. For example, depth engine 374 determines whether the fused primitive includes one or more valid flags indicating one or more primitives used to form the fused primitive are invalid in the tile. In response to the fused primitive being valid in the tile (e.g., the fused primitive includes no valid flags indicating a primitive used to form the fused primitive is invalid in the tile), depth engine 374 passes the hierarchical depth data 378 (e.g., depth values) of the fused primitive to a depth buffer 376. In response to the fused primitive not being valid in the tile (e.g., the fused primitive includes one or more valid flags indicating a primitive used to form the fused primitive is invalid in the tile), depth engine 374 rejects the hierarchical depth data 378 of the fused primitive and, as such, does not pass the hierarchical depth data 378 of the fused primitive to a depth buffer 376. If the second primitive does share an edge with a successive primitive in the tile, depth engine 374 stores a flag (e.g., valid flag) indicating whether the fused primitive is valid in the tile (e.g., whether the second primitive includes a non-shared edge or endpoint of an edge in the tile), the depth data (e.g., hierarchical depth data 378) of the fused primitive in the tile, or both in an edge buffer 380 for later primitive fusion. For example, in response to a third primitive not covering a predetermined threshold percentage of the tile, depth engine 374 determines if the third primitive shares an edge with a preceding primitive (e.g., the second primitive). In response to the third primitive sharing an edge with the preceding primitive (e.g., the second primitive), depth engine 374 fuses at least a portion of the third primitive with at least a portion of the fused primitive (e.g., the fusion of the second and first primitive) to generate a second fused primitive. For example, depth engine 374 fuses the portion of the third primitive in the tile with the valid flags and depth data of the fused primitive in the tile stored in the edge buffer to generate the second fused primitive. Depth engine 374 then determines the tile coverage of the second fused primitive by determining whether the second fused primitive is valid in a tile as described above.

Figure 4:
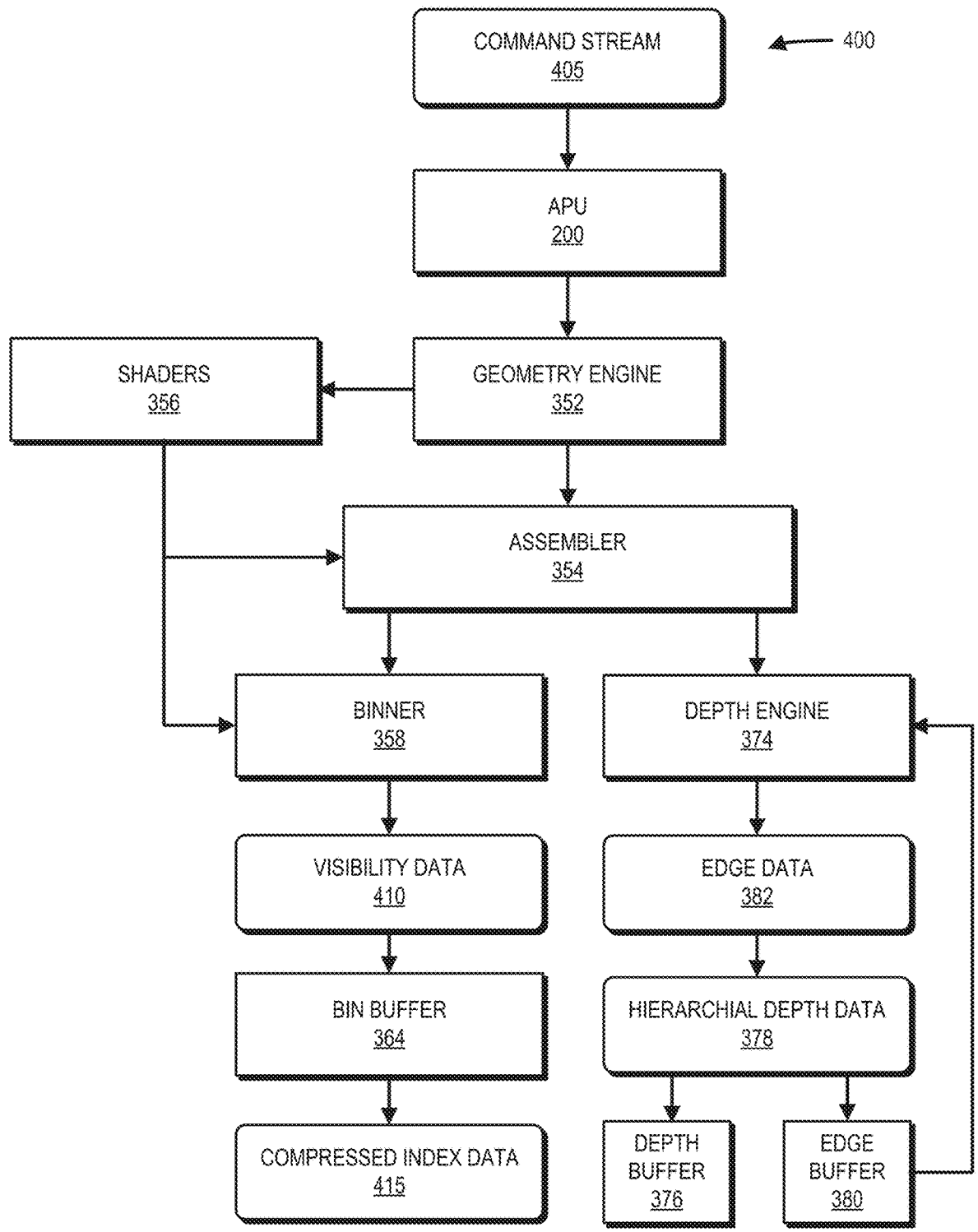
FIG. 4 is a flow diagram of an example operation for generating hierarchical depth data using primitive fusion, in accordance with some embodiments.

Referring now to FIG. 4, an example operation 400 for priming a depth buffer using hierarchical depth data is presented. In embodiments, operation 400 includes APU 200 receiving a command stream 405. Command stream 405 includes, for example, data generated by an application 110 indicating a batch of draw calls identifying one or more primitives to be rendered for textures, images, or both. In response to receiving command stream 405, APU 200 (e.g., assembler 354) is configured to read and organize primitive data indicated in command stream 405 into one or more primitives to be rendered by one or more stages of graphics pipeline 224. After reading and organizing the primitive data indicated in command stream 405, geometry engine 352 begins rendering one or more primitives to be rendered indicated in command stream 405. For example, geometry engine 352 performs one or more instructions from one or more stages associated with the frontend of graphics pipeline 224 (e.g., vertex shader stage 228, hull shader stage 230, tessellator stage 232, domain shader stage 234, geometry shader stage 236). To perform one or more instructions from one or more stages associated with the frontend of graphics pipeline 224, geometry engine 352 is configured to use shaders 356. The operation 400 further includes proving the data generated from geometry engine 352, shaders 356, or both performing one or more instructions from one or more stages associated with the frontend of graphics pipeline 224, to assembler 354, binner 358, depth engine 374, or any combination thereof. For example, the operation 400 includes geometry engine 352, shaders 356, or both providing data generated from performing one or more instructions of geometry shader stage 236 to binner 358 and depth engine 374. In embodiments, in response to assembler 354 receiving the data generated from geometry engine 352, shaders 356, or both performing one or more instructions from one or more stages associated with the frontend of graphics pipeline 224, assembler 354 organizes the data such that it is usable by binner 358, depth engine 374, or both. For example, assembler 354 organizes the data into one or more primitives. As another example, the operation 400 includes geometry engine 352, shaders 356, or both providing data generated from performing one or more instructions of the frontend of graphics pipeline 224 to binner 358. Binner 358 uses such data, for example, to perform the visibility pass for the bins (e.g., coarse bins) of an image.

In response to receiving one or more primitives from geometry engine 352, assembler 354, or both, binner 358 is configured to divide the image to be rendered into two or more bins (e.g., coarse bins) and to perform a visibility pass to generate visibility data for the bins of the image. In performing the visibility pass, operation 400 includes binner 358 generating visibility data 410, similar to or the same as visibility data 360, for each bin (e.g., coarse bin) of an image based on each primitive provided by geometry engine 352, assembler 354, or both. For example, for a first bin, binner 358 determines if each primitive provided is visible (e.g., present) in the first bin. In response to no primitives of a draw call being visible (e.g., present) in the first bin, binner 358 generates visibility data 410 that includes data (e.g., a flag) indicating that the draw call is not visible in the first bin and no primitives of the draw call are to be rendered for the first bin. Such visibility data 410 is stored, for example, in a respective bin buffer 364 (e.g., a bin buffer associated with the first bin). In response to a primitive being visible (e.g., present) in the first bin, binner 358 generates visibility data 410 that includes data indicating the primitive is visible in the bin (e.g., a flag), the draw call of the primitive is visible in the bin, or both and data indicating draw call data (e.g., draw call index data, number of primitives in a draw call), vertex data, shading data, positioning data, index data or any combination thereof, associated with the primitive. Such data is also stored, for example, in a respective bin buffer 364. According to embodiments, APU 200 is configured to compress visibility data 410 before it is stored in a bin buffer 364. In embodiments, operation 400 includes APU 200, CPU 102, or both flushing visibility data 410 from a respective bin buffer 364 to memory 106. For example, in response to a threshold event (e.g., a predetermined period of time elapsing, binner 358 completing a visibility pass, or both) APU 200 is configured to flush visibility data 410 in a buffer to memory 106. After compressed visibility data 410 is flushed from a bin buffer 364 to memory 106, APU 200, geometry engine 352, or both are configured to render one or more primitives indicated in command stream 405 based on the flushed visibility data 410. For example, in response to the flushed visibility data 410 indicating a draw call in command stream 405 is not visible in a first bin, APU 200, geometry engine 352, or both skip rendering of the primitives of that draw call in the first bin. In response to visibility data 410 indicating a primitive indicated in command stream 405 is visible in the first bin, APU 200, geometry engine 352, CPU 102, or any combination thereof render the primitive using the flushed visibility data 410 as compressed index data 415 that includes compressed data indicating the draw call data, vertex data, shading data, positioning data, index data, or any combination thereof, associated with the primitive. In this way, APU 200 uses compressed index data 415 to render the primitives of command stream 405 which improves rendering times.

Additionally, in response to depth engine 374 receiving one or more primitives from geometry engine 352, assembler 354, or both, operation 400 includes depth engine 374 determining hierarchical depth data 378 using primitive fusion for the primitives received from geometry engine 352 or assembler 354, indicated in command stream 405, or both concurrently with binner 358 determining visibility data 410 for one or more bins. To determine hierarchical depth data 378 using primitive fusion, depth engine 374 first determines edge data 382 of the primitives. Edge data 382 includes, for example, data representing shared edges (e.g., lines defining edges for two more primitives, lines defining a first primitive on a first side of the line and a second primitive on a second, opposite side of the line), non-shared edges (e.g., lines defining only one primitive), or both of the primitives received from geometry engine 352, assembler 354, or both. In embodiments, after determining edge data 382 of the primitives, depth engine 374 divides the image to be rendered into two or more tiles with each tile including a number of pixels in a first (e.g., horizontal) direction and a second number of pixels a second (e.g., vertical) direction. As an example, depth engine 374 divides an image into tiles each having eight pixels in a horizontal direction and eight pixels in a vertical direction. Then, depth engine 374 determines the tile coverage of a first primitive of the primitives to be rendered by determining whether the first primitive substantially covers each tile of the image to be rendered. That is to say, for each tile of the image, depth engine 374 determines whether the first primitive covers a predetermined threshold percentage of (e.g., whether the first primitive is visible in a predetermined threshold percentage of) the tile. In response to the first primitive covering at least the predetermined threshold percentage of the tile, depth engine 374 stores the hierarchical depth data 378 of the first primitive in the tile to one or more depth buffers 376. The hierarchical depth data 378 includes, for example, a flag (e.g., valid flag) indicating a primitive is valid in the tile, the depth of a primitive at one or more pixels of the tile, an average depth of a primitive in the tile, or any combination thereof. In response to the first primitive not covering the predetermined threshold percentage of the tile, depth engine 374 determines whether the first primitive is valid in the tile. For example, depth engine 374 determines if the first primitive includes a non-shared edge (e.g., a line not used to define another primitive in the tile), an endpoint of an edge (e.g., a vertex), or both based on, for example, edge data 382. If the first primitive is invalid in the tile (e.g., the first primitive includes a non-shared edge or endpoint of an edge in the tile), depth engine 374 generates a flag (e.g., valid flag) indicating the first primitive is invalid in the tile. If the first primitive is valid in the tile (e.g., the first primitive does not include a non-shared edge or endpoint of an edge in the tile), depth engine 374 generates a flag (e.g., valid flag) indicating the first primitive is valid in the tile.

The depth engine 374 then determines whether the first primitive shares an edge with another primitive to be rendered (e.g., shares a line that defines the first primitive and another primitive to be rendered) in the tile, based on, for example, edge data 382. If the first primitive does not share an edge with another primitive in the tile, depth engine 374 rejects the depth data of the first primitive in the tile and, as such, does not pass the depth data on to depth buffers 376. If the first primitive does share an edge with another primitive in the tile, one or more valid flags associated with the first primitive in the tile, the depth data (e.g., depth values) of the first primitive in the tile, or both are stored in one or more edge buffers 380 where it is made available for later primitive fusion. For example, depth engine 374 fuses one or more primitives to be rendered with depth data of one or more primitives, fused primitives, or both stored in edge buffer 380 to generate one or more fused primitives and determines the tile coverage of the fused primitive to generate hierarchical depth data 378.

To perform primitive fusion, after determining the tile coverage of the first primitive (e.g., determining whether the first primitive substantially covers each tile of an image), depth engine 374 determines the tile coverage for a second primitive of the primitives to be rendered. To this end, depth engine 374 determines whether the second primitive covers at least a predetermined threshold percentage of each tile of the image to be rendered. In response to the second primitive covering at least the predetermined threshold percentage of a tile, depth engine 374 passes the hierarchical depth data 378 of the second primitive in the tile to a depth buffer 376. In response to the second primitive not covering at least the predetermined threshold percentage of the tile, depth engine 374 determines whether the second primitive shares an edge (e.g., line) with a preceding primitive (e.g., a primitive that the processing system has already determined tile coverage), based on, for example, edge data 382. For example, depth engine 374 determines whether edge data 382 indicates that the second primitive shares an edge with the first primitive in the tile. In response to the second primitive not sharing an edge with a preceding primitive in the tile, depth engine 374 determines whether the second primitive shares an edge with a successive primitive (e.g., a primitive that the processing system has not yet determined tile coverage) in the tile. If the second primitive does not share an edge with a successive primitive in the tile, depth engine 374 rejects the depth data of the second primitive in the tile and, as such, does not pass the depth data on to a depth buffer 376. If the second primitive does share an edge with a successive primitive in the tile, depth engine 374 stores a flag (e.g., valid flag) indicating whether the second primitive is valid in the tile (e.g., whether the second primitive includes a non-shared edge or endpoint of an edge in the tile), the depth data (e.g., hierarchical depth data 378) of the second primitive in the tile, or both in an edge buffer 380 where it is made available for later primitive fusion.

In response to the second primitive sharing an edge with the preceding primitive (e.g., first primitive) in the tile, depth engine 374 fuses at least a portion of the second primitive with at least a portion of the preceding primitive to generate a fused primitive. As an example, in response to the second primitive sharing an edge with the first primitive in the tile, depth engine 374 fuses valid flags of a second primitive in the tile with the valid flags of a first primitive in the tile, depth data (e.g., depth values) of the second primitive in the tile with depth data of the first primitive in the tile, or both to generate a fused primitive. After generating the fused primitive, depth engine 374 then determines whether the second primitive shares an edge with a successive primitive (e.g., a primitive that the processing system has not yet determined tile coverage) in the tile. If the second primitive does not share an edge with a successive primitive in the tile, depth engine 374 then determines the tile coverage of the fused primitive by, for example, determining whether the fused primitive is valid in the tile. To determine whether the fused primitive is valid in a tile, depth engine 374 determines whether the fused primitive is associated with (e.g., includes) one or more flags (e.g., valid flags) indicating that one or more primitives used to form the fused primitive are invalid in the tile. In response to the fused primitive being valid in the tile (e.g., no flags associated with the fused primitive indicate one or more primitives used to form the fused primitive are invalid in the tile), depth buffer 374 passes the depth data (e.g., hierarchical depth data 378) of the fused primitive in the tile to a depth buffer 376. In response to the fused primitive not being valid in the tile (e.g., one or more flags associated with the fused primitive indicate one or more primitives used to form the fused primitive are invalid in the tile), depth engine 374 rejects the depth data of the fused primitive in the tile and, as such, does not pass the depth data of the fused primitive in the tile to a depth buffer 376.

If the second primitive does share an edge with a successive primitive in the tile, depth engine 374 stores a flag (e.g., valid flag) indicating whether the fused primitive is valid in the tile, the depth data (e.g., hierarchical depth data 378) of the fused primitive in the tile, or both in an edge buffer 380 for later primitive fusion. For example, in response to a third primitive not covering at least a predetermined threshold percentage of the tile, depth engine 374 determines if the third primitive shares an edge with a preceding primitive (e.g., the second primitive) in the tile. In response to the third primitive sharing an edge with the preceding primitive (e.g., the second primitive) in the tile, depth engine 374 fuses at least a portion of the third primitive with at least a portion of the fused primitive (e.g., fusion of the second and first primitive) to generate a second fused primitive. For example, depth engine 374 fuses the portion of the third primitive in the tile with the depth data of the fused primitive in the tile stored in the edge buffer to generate the second fused primitive. Depth engine 374 then determines the tile coverage of the second fused primitive by, for example, determining if the second fused primitive is valid in a tile as discussed above. In this way, depth engine 374 generates hierarchical depth data that is used to prime the depth buffer. As the hierarchical depth data is made available in the depth buffer for performing pixel-based rendering, the time needed to perform pixel-based rendering of the primitives at the backend of graphics pipeline 124 is reduced.

Figure 5:
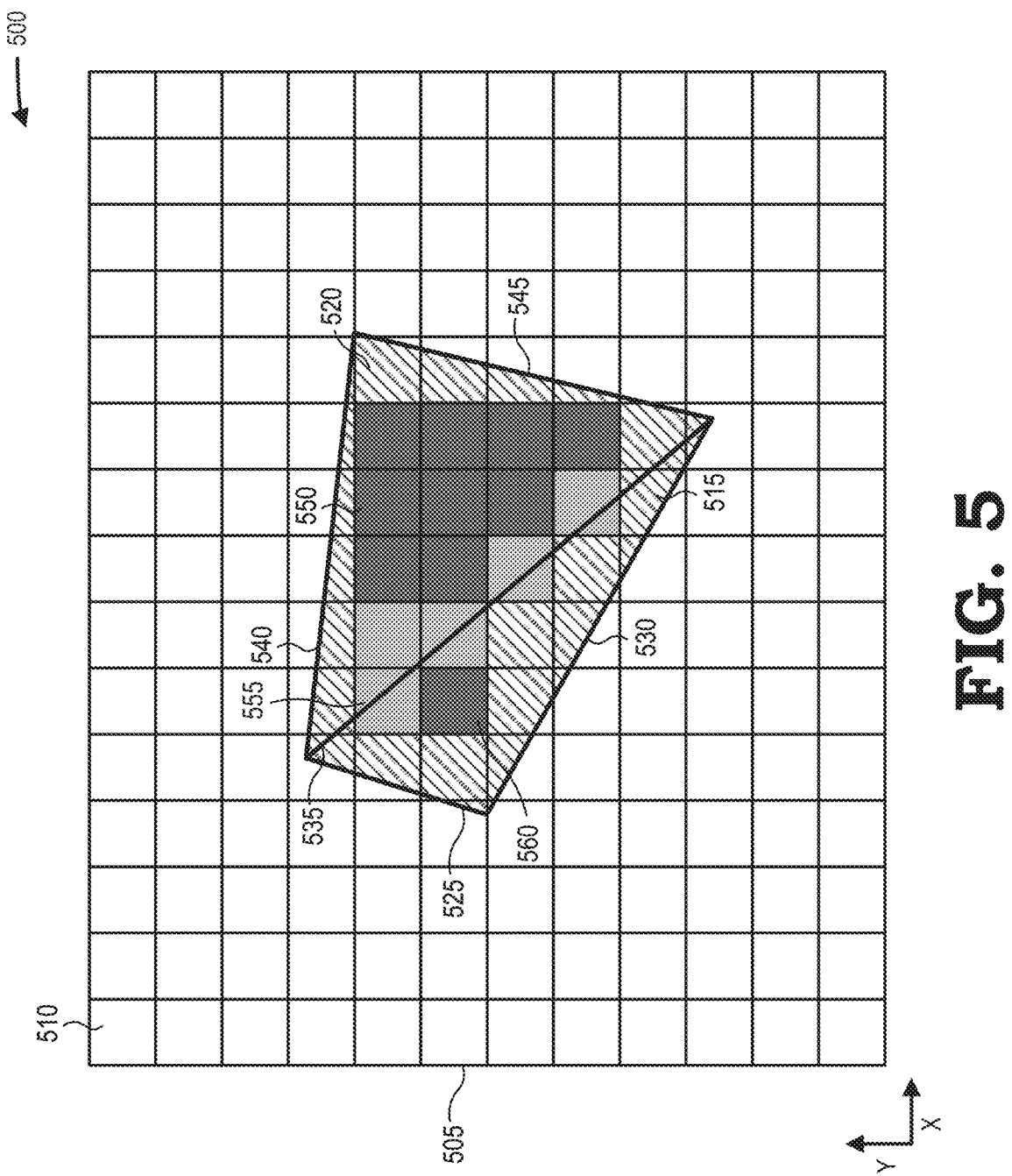
FIGS. 5 and 6 each present a diagram of example primitives together covering one or more tiles of an image used to generate hierarchical depth data using primitive fusion, in accordance with some embodiments.
Figure 6:
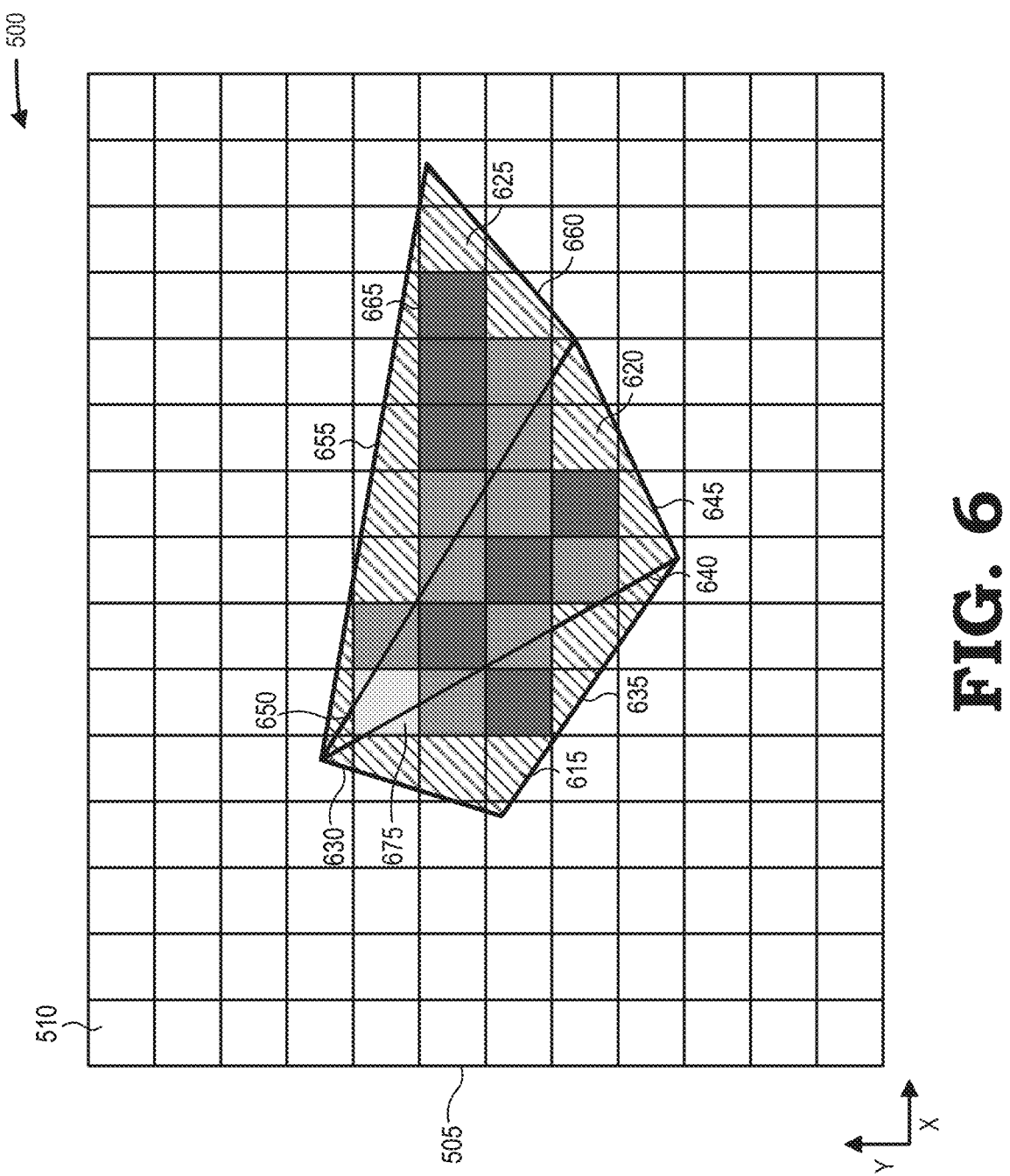

Referring now to FIGS. 5 and 6, example diagrams 500 of two or more primitives covering one or more tiles of an image used to generate hierarchical depth data are presented. Each of FIGS. 5 and 6 refer to an image 505 divided into one or more tiles 510. For example, FIGS. 5 and 6 refer to an image 505 divided into at least 15 tiles in an x-direction and at least 12 tiles in a y-direction. Referring now to the diagram 500 presented in FIG. 5, a first primitive 515 (e.g., illustrated by patterned shading) defined by lines 525, 530, and 535 of image 505, and a second primitive 520 (illustrated by patterned shading) defined by lines 535, 540, and 545 of image 505, are illustrated. In embodiments, to generate hierarchical depth data, similar to or the same as hierarchical depth data 378, a depth engine, similar to or the same as depth engine 374, first determines the tile coverage of the first primitive 515 by determining whether the first primitive 515 covers (e.g., is visible or present in) at least a predetermined threshold percentage of each tile 510 in image 505. In response to the first primitive 515 covering at least a predetermined threshold percentage of a tile 510, the depth engine passes the hierarchical depth data (e.g., the depth data of the first primitive 515 in the tile) to a depth buffer, similar to or the same as depth buffers 376. For example, in the example embodiment illustrated in FIG. 5, the first primitive 515 covers at least a predetermined threshold percentage of (e.g., completely covers) tile 560 (illustrated by dark shading) and, as such, the depth engine passes the hierarchical depth data of the first primitive 515 in tile 560 to the depth buffer. In response to the first primitive 515 not covering at least a predetermined threshold percentage of (e.g., only partially covering) a tile 510, the depth engine determines whether the first primitive 515 is valid in the tile 510. For example, the depth engine determines whether the first primitive 515 includes a non-shared edge in the tile 510 (e.g., the first primitive 515 is defined by a line in the tile 510 not used to define another primitive in the tile 510), an endpoint of an edge (e.g., a vertex) in the tile 510, or both. In response to the first primitive 515 being valid in the tile (e.g., the first primitive 515 does not include a non-shared edge or endpoint of an edge in the tile 510), the depth engine generates a flag (e.g., valid flag) indicating the first primitive 515 is valid in that tile 510. In response to the first primitive 515 being invalid in the tile (e.g., the first primitive 515 includes a non-shared edge or endpoint of an edge in the tile 510), the depth engine generates a flag (e.g., valid flag) indicating the first primitive 515 is invalid in that tile 510. For example, in the example embodiment illustrated in FIG. 5, lines 525 and 530 defining the first primitive 515 are unshared in 12 tiles 510 of the image 505. As such, the depth engine flags the first primitive 515 as invalid in these tiles 510.

The depth engine then determines whether the first primitive 515 shares an edge with another primitive to be rendered in the tile 510. If the first primitive 515 does not share an edge with another primitive in the tile 510, the depth engine rejects the depth data of the first primitive 515 in the tile 510, and, as such, does not pass the depth data on to the depth buffer. If the first primitive 515 does share an edge with another primitive in the tile 510, the depth engine stores the flag (e.g., valid flag) indicating whether the first primitive 515 is valid in the tile 510, the depth data (e.g., depth values) of the first primitive in the tile 510, or both in an edge buffer, similar to or the same as edge buffers 380 where it is available for primitive fusion. For example, in the example embodiment illustrated in FIG. 5, the first primitive 515 does not cover at least a predetermined threshold percentage (e.g., only partially covers) five tiles 555 (illustrated with lighter shading). Additionally, the first primitive 515 shares line 535 (e.g., an edge) with the second primitive 520 in these five tiles 555. As such, the depth engine stores the valid flags and depth data of the first primitive 515 in these five tiles 555 in an edge buffer for later primitive fusion.

Still referring to the diagram 500 presented in FIG. 5, after determining the tile coverage of the first primitive 515 (e.g., the depth engine has determined whether the first primitive covers at least a predetermined threshold percentage of each tile 510 of the image 505), the depth engine determines the tile coverage of the second primitive 520 by determining whether the second primitive 520 covers at least a predetermined threshold percentage of each tile 510. In response to the second primitive 520 covering at least a predetermined threshold percentage of a tile 510, the depth engine passes the hierarchical depth data of the second primitive 520 in that tile 510 to the depth buffer. For example, in the example embodiment illustrated in FIG. 5, the second primitive 520 covers at least a predetermined threshold percentage (e.g., completely covers) nine tiles 550 (illustrated with dark shading). As such, the depth engine passes the hierarchical depth data of the second primitive 520 in these nine tiles 550 to a depth buffer. In response to the second primitive 520 not covering at least a predetermined threshold percentage of (e.g., only partially covering) a tile 510, the depth engine determines whether the second primitive 520 shares an edge with a preceding primitive (e.g., a primitive for which the depth engine has already determined tile coverage) in that tile. In response to the second primitive 520 not sharing an edge with a preceding primitive in the tile, the depth engine rejects the depth data of the second primitive 520 in the tile if the second primitive also does not share an edge with a successive primitive (e.g., a primitive for which the depth engine has yet to determine tile coverage) in the tile or stores the valid flag and depth data of the second primitive 520 in the tile in an edge buffer if the second primitive does share an edge with a successive primitive in the tile 510. In response to the second primitive 520 sharing an edge with a preceding primitive in the tile 510, the depth engine fuses at least a portion of the second primitive 520 with at least a portion of the preceding primitive to generate a fused primitive. For example, the depth engine fuses the valid flag and depth values of the portion of the second primitive in the tile 510 with the valid flag and depth values of the preceding primitive in the tile 510 stored in an edge buffer to generate a fused primitive.

The depth engine then determines whether the second primitive shares an edge with a successive primitive in the tile 510. If the second primitive does not share an edge with a successive primitive, the depth engine then determines the tile coverage of the fused primitive by determining whether the fused primitive is valid in a tile 510 based on one or more valid flags associated with (e.g., included in) the fused primitive. In response to the fused primitive being valid in a tile 510 (e.g., the fused primitive includes no flags indicating a primitive used to form the fused primitive is invalid in the tile 510), the depth engine passes the depth data (e.g., hierarchical depth data) of the fused primitive in the tile 510 to a depth buffer. In response to the fused primitive not being valid in a tile 510 (e.g., the fused primitive includes one or more flags indicating a primitive used to form the fused primitive is invalid in the tile 510), the depth engine rejects the depth data of the fused primitive in the tile 510 and, as such, does not pass the depth data of the fused primitive in the tile to the depth buffer. If the second primitive does share an edge with a successive primitive in a tile 510, the depth engine stores one or more valid flags associated with (e.g., included in) the fused primitive in the tile 510 and the depth data of the fused primitive in the tile 510 in an edge buffer where it is made available for later primitive fusion. As an example, in the example embodiment illustrated in FIG. 5, the second primitive 520 does not cover at least a predetermined threshold percentage of the five tiles 555 (illustrated with light shading). Additionally, the second primitive 520 shares line 535 (e.g., an edge) with the first primitive 515 (e.g., a preceding primitive) in each of those five tiles 555. As such, the depth engine fuses the portions of the second primitive 520 in these five tiles 555 with, for example, depth data of the first primitive 515 in these tiles 555 stored in an edge buffer to generate fused primitives in each of the five tiles 555. Because the fusion of the second primitive 520 and the first primitive 515 is valid in each of the five tiles 555 (e.g., neither the first primitive 515 or second primitive 520 include any non-shared edges or vertices), the depth engine passes the depth data of the fused primitives in these tiles 555 to the depth buffer. The depth data in the depth buffer is then made available, for example, for pixel engine 370 to perform pixel-based rendering of the first primitive 515 and the second primitive 520.

Referring now to the diagram 500 presented in FIG. 6, a first primitive 615 (e.g., illustrated by patterned shading) defined by lines 630, 635, and 640 of image 505, a second primitive 620 (illustrated by patterned shading) defined by lines 640, 645, and 650 of image 505, and a third primitive 625 (illustrated by patterned shading) defined by lines 650, 655, and 660 of image 505 are illustrated. In embodiments, to generate hierarchical depth data, similar to or the same as hierarchical depth data 378, a depth engine, similar to or the same as depth engine 374, first determines the tile coverage of the first primitive 615 by determining whether the first primitive 615 covers (e.g., is visible or present in) at least a predetermined threshold percentage of each tile 510 in image 505. In response to the first primitive 615 covering at least a predetermined threshold percentage of a tile 510, the depth engine passes the hierarchical depth data (e.g., the depth data of the first primitive 615 in the tile) to a depth buffer, similar to or the same as depth buffers 376. For example, in the example embodiment illustrated in FIG. 6, the first primitive 615 covers at least a predetermined threshold percentage (e.g., completely covers) of one tile (illustrated by dark shading) and, as such, the depth engine passes the hierarchical depth data of the first primitive 615 in that tile to the depth buffer. In response to the first primitive 615 not covering (e.g., only partially covering) at least a predetermined threshold percentage of a tile 510, the depth engine determines whether the first primitive 615 is valid in the tile 510 by, for example, determining whether the first primitive 615 includes a non-shared edge in the tile 510 (e.g., the first primitive 615 is defined by a line in the tile 510 not used to define another primitive in the tile 510), an endpoint of an edge (e.g., a vertex) in the tile 510, or both. In response to the first primitive 615 being valid in a tile 510 (e.g., the first primitive 615 does not include a non-shared edge or endpoint of an edge in the tile 510), the depth engine generates a flag indicating the first primitive 615 is valid in that tile 510. In response to the first primitive 615 being invalid in a tile 510 (e.g., the first primitive 615 includes a non-shared edge or endpoint of an edge in the tile 510), the depth engine generates a flag indicating the first primitive 615 is invalid in that tile 510. For example, in the example embodiment illustrated in FIG. 6, lines 630 and 635 defining the first primitive 615 are unshared in 11 tiles 510 of the image 505. As such, the depth engine flags the first primitive 615 as invalid in these tiles 510.

The depth engine then determines whether the first primitive 615 shares an edge with another primitive to be rendered in the tile 510. If the first primitive 615 does not share an edge with another primitive in that tile 510, the depth engine rejects the depth data of the first primitive 615 in the tile 510, as such, does not pass the depth data on to the depth buffer. If the first primitive 615 does share an edge with another primitive in the tile 510, the depth engine stores a flag (e.g., valid flag) indicating whether the first primitive 615 is valid in the tile 510, the depth data (e.g., depth values) of the first primitive 615 in the tile 510, or both in an edge buffer, similar to or the same as edge buffers 380, where it is available for primitive fusion. For example, in the example embodiment illustrated in FIG. 6, the first primitive 615 does not cover a predetermined threshold percentage of (e.g., only partially covers) tile 675 (illustrated with light shading) or three other three tiles 510 (illustrated with medium shading). Additionally, the first primitive 515 shares line 640 (e.g., an edge) with the second primitive 620 in these four tiles. As such, the depth engine stores the valid flags and depth data of the first primitive 615 in these tiles in an edge buffer for later primitive fusion.

Still referring to the diagram 500 presented in FIG. 6, after determining the tile coverage of the first primitive 615 (e.g., the depth engine has determined whether the first primitive covers at least a predetermined threshold percentage of each tile 510 of the image 505), the depth engine determines the tile coverage of the second primitive 620 by determining whether the second primitive 620 covers at least a predetermined threshold percentage of each tile 510. In response to the second primitive 620 covering at least a predetermined threshold percentage of a tile 510, the depth engine passes the hierarchical depth data of the second primitive 620 in that tile 510 to the depth buffer. For example, in the example embodiment illustrated in FIG. 6, the second primitive 620 covers at least a predetermined threshold percentage of (e.g., completely covers) three tiles 510 (illustrated with dark shading). As such, the depth engine passes the hierarchical depth data of the second primitive 620 in these three tiles 510 to a depth buffer. In response to the second primitive 620 not covering at least a predetermined threshold percentage of (e.g., only partially covering) a tile 510, the depth engine determines whether the second primitive 620 shares an edge with a preceding primitive (e.g., a primitive for which the depth engine has already determined tile coverage) in that tile. In response to the second primitive 620 not sharing an edge with a preceding primitive in the tile, the depth engine determines whether the second primitive 620 shares an edge with a successive primitive (e.g., a primitive for which the depth engine has yet to determine tile coverage) in the tile. If the second primitive 620 does not share an edge with a successive primitive in the tile, the depth engine rejects the depth data of the second primitive 620 in that tile and, as such, does not pass it on to a depth buffer. If the second primitive 620 does share an edge with a successive primitive in the tile, the depth engine stores a flag indicating (e.g., valid flag) whether the second primitive 620 is valid in the tile 510, the depth data of the second primitive 620 in the tile 510, or both in an edge buffer for later primitive fusion. For example, referring to the example embodiment illustrated in FIG. 6, the second primitive 620 does not cover at least a predetermined threshold percentage of (e.g., only partially covers) six tiles 510 (illustrated by medium shading) where the second primitive 620 also shares line 650 (e.g., an edge) with the third primitive 625 (e.g., a successive primitive). As such, the depth buffer stores valid flags indicating the second primitive 620 is valid in these tiles and the depth data (e.g., depth values) of the second primitive 620 in these tiles in an edge buffer for future primitive fusion.

In response to the second primitive sharing an edge with a preceding primitive in the tile 510, the depth engine fuses at least a portion of the second primitive 620 with at least a portion of the preceding primitive to generate a fused primitive. For example, the depth engine fuses a portion of the second primitive 620 in a tile with the valid flag and depth data of a preceding primitive in the tile stored in an edge buffer to generate a fused primitive. After producing the fused primitive, the depth engine then determines whether the second primitive 620 shares an edge with a successive primitive in the tile 510. If the second primitive 620 does not share an edge with a successive primitive in the tile 510, the depth engine determines whether the fused primitive is valid in the tile. That is to say, the depth engine determines whether any valid flags associated with (e.g., included in) the fused primitive indicate one or more primitives used to form the fused primitive are invalid in the tile 510. If the fused primitive is valid in the tile 510 (e.g., no valid flags associated with the fused primitive indicate that one or more primitives used to form the fused primitive are invalid in the tile 510), the depth engine passes the depth data (e.g., hierarchical depth data) of the fused primitive in the tile to the depth buffer. As an example, in the example embodiment illustrated in FIG. 6, fused primitives resulting from fusing portions of the first primitive 615 with the second primitive 620 in tiles where the first and second primitives 615, 620 share an edge (e.g., line 640), are valid (e.g., have no non-shared edges or vertices) in three tiles 510 (illustrated with medium shading). As such, the depth buffer passes the depth data of the fused primitives in these tiles to the depth buffer. If the fused primitive is not valid in a tile 510 (e.g., one or more valid flags associated with the fused primitive indicate that one or more primitives used to form the fused primitive are invalid in the tile 510), the depth engine rejects the depth data of the fused primitive in the tile 510 and, as such, does not pass the depth data of the fused primitive in the tile 510 to the depth buffer.

If the second primitive does share an edge with a successive primitive in the tile 510, the depth engine stores one or more valid flags associated with the fused primitive in the tile 510 and the depth data of the fused primitive in the tile 510 in an edge buffer for future primitive fusion. As an example, referring to the example embodiment illustrated in FIG. 6, the depth engine generates a fused primitive by fusing a portion of the first primitive 515 and the second primitive 520 in tile 675 (illustrated with light shading). Additionally, the second primitive 620 shares line 650 (e.g., an edge) with the third primitive 625 (e.g., a successive primitive). As such, the depth engine stores the valid flag and depth data of the fused primitive in tile 675 to an edge buffer.

Still referring to the diagram 500 presented in FIG. 6, after determining the tile coverage of the second primitive 620 (e.g., the depth engine has determined whether the second primitive 620 covers at least a predetermined threshold percentage of each tile 510 of the image 505), the depth engine determines the tile coverage of the third primitive 625 by determining whether the third primitive 625 covers at least a predetermined threshold percentage of each tile 510. In response to the third primitive 625 covering at least a predetermined threshold percentage of a tile 510, the depth engine passes the hierarchical depth data of the third primitive 625 in that tile 510 to the depth buffer. For example, in the example embodiment illustrated in FIG. 6, the third primitive 625 covers at least a predetermined threshold percentage (e.g., completely covers) three tiles 510 (illustrated with dark shading). As such, the depth engine passes the hierarchical depth data of the third primitive 625 in these three tiles 510 to a depth buffer. In response to the third primitive 625 not covering at least a predetermined threshold percentage (e.g., only partially covering) a tile 510, the depth engine determines whether the third primitive 625 shares an edge with a preceding primitive (e.g., a primitive for which the depth engine has already determined tile coverage) in that tile. In response to the third primitive 625 not sharing an edge with a preceding primitive in the tile, the depth engine rejects the depth data of the third primitive 625 in the tile if the third primitive 625 also does not share an edge with a successive primitive in the tile. Further, in response to the third primitive 625 not sharing an edge with a preceding primitive in the tile, the depth engine stores a flag (e.g., valid flag) indicating whether the third primitive 625 is valid in the tile 510, the depth data of the third primitive 625 in the tile 510, or both in an edge buffer if the third primitive 625 does share an edge with a successive primitive in the tile. In response to the third primitive 625 sharing an edge with a preceding primitive in the tile, the depth engine fuses at least a portion of the third primitive 625 with at least a portion of the preceding primitive to generate a second fused primitive.

After generating the second fused primitive, the depth engine then determines whether the third primitive 625 shares an edge with a successive primitive. If the third primitive 625 does not share an edge with a successive primitive, the depth engine determines whether the second fused primitive is valid in the tile 510. For example, the depth engine determines whether one or more flags (e.g., valid flags) associated with the second fused primitive indicate that one or more primitives used to fuse the second fused primitive are invalid in the tile 510. In response to the second fused primitive being valid in the tile 510, the depth engine passes the hierarchical depth data of the second fused primitive in the tile 510 to the depth buffer. In response to the second fused primitive not being valid in the tile, the depth engine rejects the depth data of the second fused primitive in the tile. If the third primitive 625 does share an edge with a successive primitive, the depth engine stores a valid flag and depth data of the second fused primitive in the tile 510 in an edge buffer for future primitive fusion. As an example, in the example embodiment illustrated in FIG. 6, the third primitive 625 does not cover at least a predetermined threshold percentage of tile 675 (illustrated with light shading). Additionally, the third primitive 625 shares line 650 (e.g., an edge) with the second primitive. As such, the depth engine fuses at least a portion of the third primitive 625 with at least a portion of the second primitive 620 to generate a second fused primitive. For example, the depth engine fuses the portion of the third primitive 625 in tile 675 with the depth data of the second primitive 620 in tile 675 as fused with the first primitive 615 stored in an edge buffer to generate the second fused primitive. That is to say, the depth engine fuses the portion of the third primitive 625 in tile 675 with the depth data of the fused primitive (e.g., a fusion of the first primitive 615 and second primitive 620) in tile 675. Because the second fused primitive (fusion of the first, second, and third primitives 615, 620, 625 in tile 675) is valid (e.g., does not include a non-shared edge or vertex) in tile 675, the depth engine passes the depth data of the fused primitive to the depth buffer. The depth data passed on to the depth buffer is then made available, for example, for pixel engine 370 to perform pixel-based rendering of the first primitive 615, the second primitive 620, and the third primitive 625.

Figure 7:
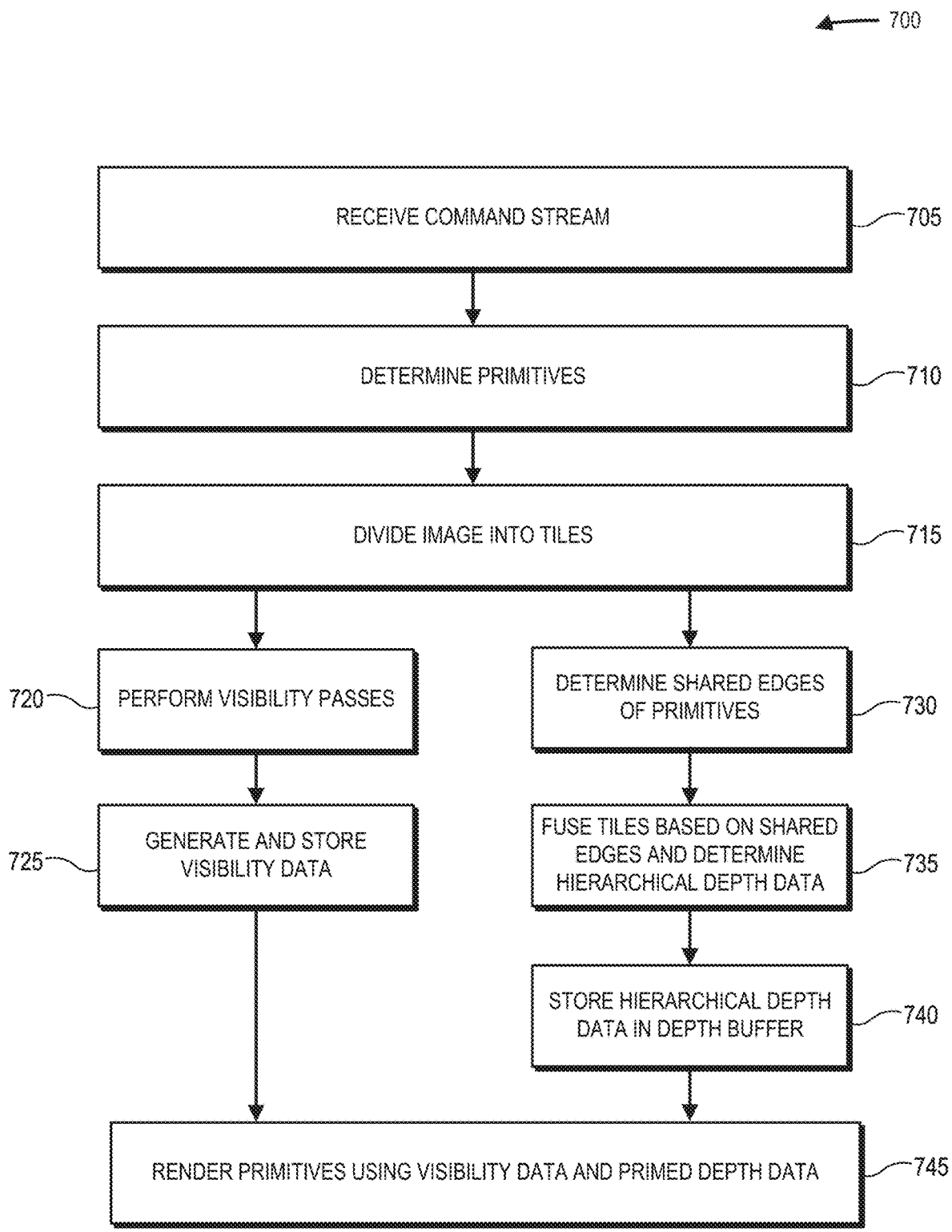
FIG. 7 is a flow diagram of an example method for rendering one or more primitives using visibility and hierarchical depth data, in accordance with some embodiments.

Referring now to FIG. 7, a flow diagram of an example method 700 for rendering one or more primitives using visibility and hierarchical depth data is presented. At step 705, an APU, similar to or the same as APU 114, 200, receives a command stream, similar to or the same as command stream 405, indicating one or more primitives to be rendered for one or more textures, images, or both. For example, the APU receives a command stream from an application 110 indicating a batch of draw calls identifying one or more primitives to be rendered for one or more textures, images, or both. At step 710, the APU performs one or more operations to at least partially render the primitives indicated in the command stream. For example, the APU performs one or more instructions from one or more stages (e.g., assembler stage, vertex shader stage, hull shader stage, tessellator stage, domain shader stage, geometry shader stage) of the frontend of a graphics pipeline, similar to or the same as graphics pipeline 224 to at least partially render the primitives indicated in the command stream. At step 715, the APU divides the image into two or more bins (e.g., coarse bins) each including a number of pixels in a first (e.g., horizontal) direction and second number of pixels in a second (e.g., vertical) direction. In embodiments, each bin (e.g., coarse bin) includes a number of tiles in a first (e.g., horizontal) direction and a second number of tiles in a second (e.g., vertical) direction. At step 720 the APU performs a visibility pass for the image to generate visibility data for the bins (e.g., coarse bins) of the image by determining which of the primitives indicated in the command stream are visible (e.g., present) in which bins. At step 825, based on the visibility pass, the APU generates visibility data, similar to or the same as visibility data 360, 410, for each bin (e.g., coarse bin). For example, for each bin, APU determines whether each primitive is visible in the bin. In response to no primitives of a draw call being visible in the bin, the APU generates visibility data (e.g., a flag) indicating that the draw call is not visible in the bin and the primitives of the draw call are not to be rendered for that bin. In response to a primitive being visible in the bin, the APU generates visibility data (e.g., a flag) indicating the draw call of the primitive, the primitive, or both are visible in the bin and data indicating draw call data (e.g., draw call index data, number of primitives in a draw call), vertex data, shading data, positioning data, index data, or any combination thereof, associated with the primitive in the bin. After generating visibility data for a bin, the APU compresses and stores the generated visibility data in a bin buffer, similar to or the same as bin buffers 364, associated with the bin.

In embodiments, at step 730, the APU performs hierarchical depth data determinations using primitive fusion for the primitives indicated in the command stream. To this end, the APU first determines the shared edges (e.g., shared lines), non-shared edges, or both of the primitives indicated in the command stream. For example, the APU determines the shared edges (e.g., lines) having one primitive on a first side of the edge and a second primitive on a second, opposite side of the edge, the non-shared edges (e.g., lines) only defining one primitive, or both indicated in the command stream. After determining the shared edges of the primitives, the system moves on to step 735. At step 735, the APU generates hierarchical depth data, similar to or the same as hierarchical depth data 378, for each of the primitives indicated in the command stream by determining the tile coverage of each primitive. To determine the tile coverage of a primitive, the APU determines, for each tile of the image, whether a primitive covers (e.g., is visible in) at least a predetermined threshold percentage of the tile. In response to the primitive covering a predetermined threshold percentage of the tile, the APU passes the depth data of the primitive in the tile (e.g., hierarchical depth data) to a depth buffer where the depth data is made available for pixel-based rendering of the primitive. In response to the primitive not covering a threshold percentage of the tile, the APU then fuses the primitive with one or more preceding primitives (e.g., primitives for which the APU has already determined tile coverage) based on whether the primitive shares an edge with one or more preceding primitives in the tile. For example, in response to the primitive sharing an edge with a preceding primitive in the tile, the APU fuses at least a portion of the primitive in the tile with at least a portion of a preceding primitive in the tile to generate a fused primitive. As another example, in response to the primitive sharing an edge with a previously fused primitive (e.g., sharing an edge with a primitive previously fused with another primitive), the APU fuses at least a portion of the primitive in the tile with at least a portion of the previously fused primitive in the tile to generate a fused primitive. To fuse at least a portion of the primitive with at least a portion of a preceding primitive, fused primitive, or both the APU, for example, adds the depth data of the preceding primitive, fused primitive, or both in the tile to the depth data of the primitive in the tile, averages the depth data of the preceding primitive, fused primitive, or both in the tile with the depth data of the primitive in the tile, determines a maximum depth from the depth data of the preceding primitive, fused primitive, or both in the tile, determines a minimum depth from the depth data of the preceding primitive, fused primitive, or both in the tile, or any combination thereof. After generating the fused primitive in the tile, the APU then determines whether the primitive shares an edge with a successive primitive (e.g., a primitive for which APU has not yet determined tile coverage) in the tile.

In response to the primitive not sharing an edge with a successive primitive, the APU determines if the fused primitive is valid in the tile. For example, the APU determines whether one or more valid flags associated with (e.g., included in) the fused primitive indicate that one or more primitives used to generate the fused primitive are not valid in the tile. If the fused primitive is valid in the tile (e.g., no valid flags associated with the fused primitive indicate a primitive used to generate the fused primitive is invalid in the tile), the APU passes the depth data (e.g., hierarchical depth data) of the fused primitive in the tile to the depth buffer. If the fused primitive is not valid in the tile (e.g., one or more valid flags associated with the fused primitive indicate a primitive used to generate the fused primitive is invalid in the tile), the APU rejects the depth data of the fused primitive in the tile and, as such, does not pass the depth data of the fused primitive in the tile to the depth buffer. In response to the primitive sharing an edge with a successive primitive in the tile, the valid flags associated with the fused primitive and the depth data of the fused primitive are stored in an edge buffer and are made available for future primitive fusion. At step 740, the APU passes the hierarchical depth data of the fused primitive (e.g., the depth data of the fused primitive in the tile) to the depth buffer where it is made available for pixel-based rendering of the primitive and one or more preceding primitives (e.g., those used to generate the fused primitive). For example, in response to the fused primitive being valid in a tile, the APU passes the hierarchical depth data of the fused primitive to the depth buffer. In embodiments, the APU performs step 720, step 725, or both concurrently with step 730, step 735, step 740, or any combination thereof.

At step 745, the APU, a CPU, similar to or the same as CPU 102, or both are configured to flush one or more bin buffers storing compressed visibility data into memory 106. For example, the APU, CPU, or both are configured to flush a bin buffer in response to the completion of a visibility pass, after a predetermined amount of time has elapsed, or both. In embodiments, the APU, CPU, or both flush the compressed visibility data into memory 106 such that the flushed visible data is available as compressed index data, similar to or the same as compressed index data 372, 415. According to embodiments, the APU, CPU, or both are configured to render one or more primitives indicated in the command stream using the compressed index data. For example, the APU is configured to perform at least a portion of the frontend of graphics pipeline 224 (e.g., tile-based rendering) using the compressed index data to render the primitives indicated in the command stream. Additionally, at step 745, the APU, CPU, or both perform at least a portion of the backend of graphics pipeline (e.g., pixel-based rendering) using the depth data stored in the depth buffers. For example, in response to the APU rendering at least a portion of a primitive by performing at least a portion of the frontend of graphics pipeline 224 (e.g., tile-based rendering), the APU is configured to render the primitive by using depth data stored in the depth buffers to perform at least a portion of the backend of graphics pipeline 224 (e.g., pixel-based rendering). By using the depth data stored in the depth buffers, the time to render the primitive is reduced, improving the efficiency of the system.

Figure 8:
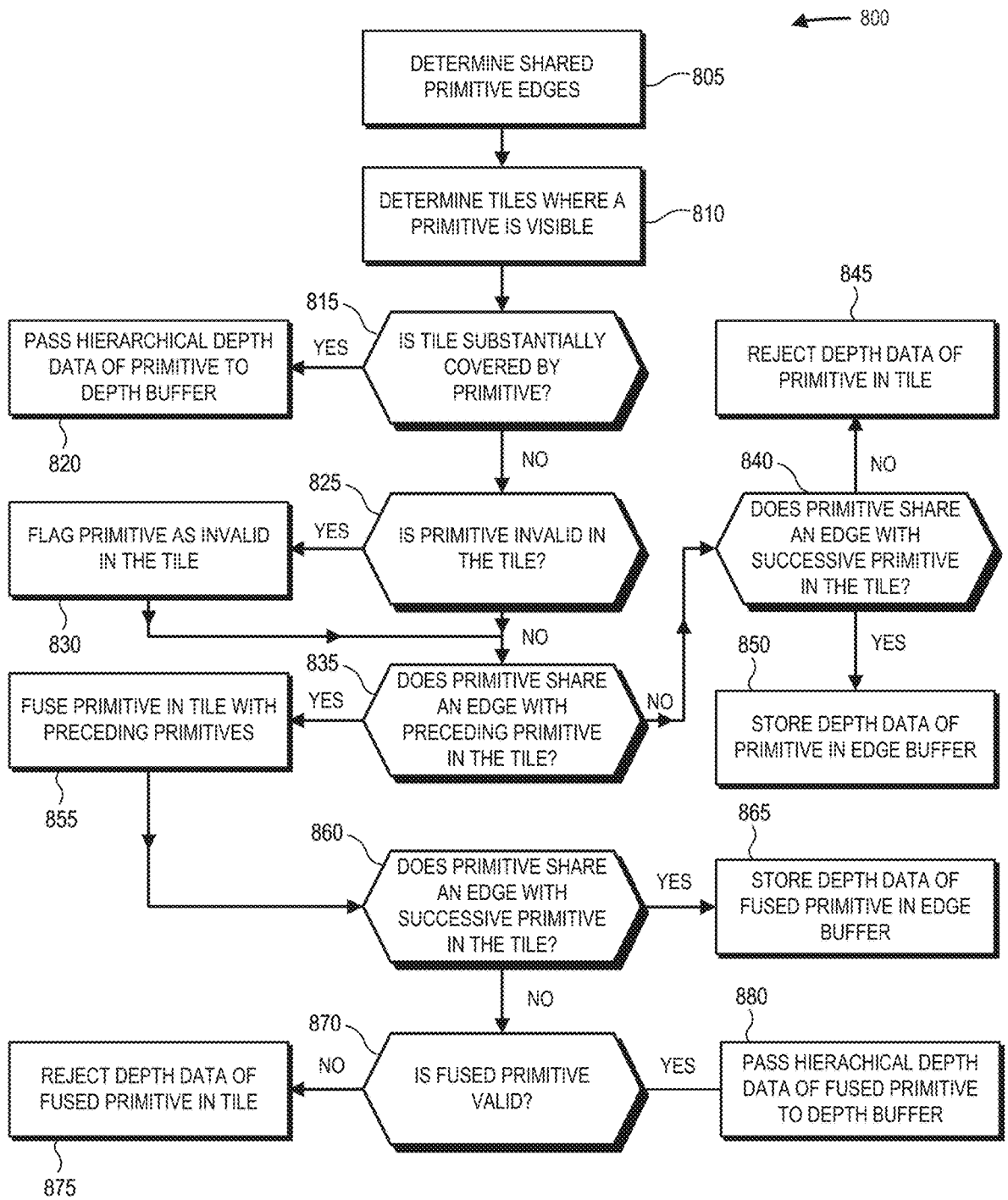
FIG. 8 is a flow diagram of an example method for generating hierarchical depth data using primitive fusion to prime a depth buffer, in accordance with some embodiments.

Referring now to FIG. 8, an example method 800 for generating hierarchical depth data using primitive fusion is presented. At step 805, an APU, similar to or the same as APU 114, 200, receives a request to render a plurality of primitives. For example, the APU receives a command stream from an application 110 indicating a plurality of primitives to be rendered for an image. The APU then determines the shared edges and non-shared edges between the plurality of primitives. For example, the APU determines the edges (e.g., lines) that define two or primitives in one or more tiles of an image and edges (e.g., lines) that define only one primitive in one or more tiles of the image. At step 810, the APU determines the tile coverage of a primitive of the plurality of primitive by determining in which tiles of the image the primitive is visible. For example, the APU determines in which tiles a primitive is visible in based on the visibility pass performed by binner 358. At step 815, the APU then determines whether each tile of the image is substantially covered by the primitive. That is to say, for each tile where the primitive is visible, the APU determines whether the primitive covers at least a predetermined threshold percentage of the tile. As an example, the APU determines whether the primitive completely covers a tile. In response to the primitive covering at least a predetermined threshold percentage of the tile, the system moves to step 820. At step 820, the APU passes the depth data of the primitive in the tile (e.g., the hierarchical depth data of the primitive) to a depth buffer, similar to or the same as depth buffers 376. In response to the primitive not covering at least a predetermined threshold percentage of the tile (e.g., only partially covering the tile) the system moves on to step 825. At step 825, the APU determines whether the primitive is invalid in the tile. To determine if the primitive is invalid, the APU determines whether the primitive includes a non-shared edge (e.g., is defined by a line in the tile not shared with another primitive in the tile), an endpoint of an edge (e.g., a vertex), or both in the tile. In response to the primitive being invalid in the tile (e.g., the primitive includes a non-shared edge or endpoint of an edge in the tile), the system moves to step 830. At step 830, the APU generates a flag (e.g., valid flag) indicating that the primitive is invalid in the tile and moves to step 835. Referring again to step 825, in response to the primitive being valid in the tile (e.g., the primitive does not include a non-shared edge or endpoint of an edge in the tile), the system also moves to step 835.

At step 835, the APU determines whether the primitive shares an edge with one or more preceding primitives (e.g., primitives for which the APU has already determined tile coverage) in the tile. In response to the primitive not sharing an edge with a preceding primitive in the tile, the system moves on to step 840. At step 840, the APU determines whether the primitive shares an edge with one or more successive primitives (e.g., primitives for which APU has not yet determined tile coverage) in the tile. In response to the primitive not sharing an edge with a successive primitive in the tile, the system moves on to step 845. At step 845, the APU rejects the depth data of the primitive in the tile and, as such, does not pass the depth data on to the depth buffer. In response to the primitive sharing an edge with a successive primitive in the tile, the system moves on to step 850. At step 850, the APU stores a flag (e.g., valid flag) indicating whether the primitive is valid in the tile (e.g., whether the primitive includes a non-shared edge or endpoint of an edge in the tile), depth data of the primitive in the tile, or both in an edge buffer, similar to or the same as edge buffers 380, where it is available for primitive fusion.

Referring again to step 835, in response to the primitive sharing an edge with a preceding primitive in the tile, the system moves on to step 855. At step 855, the APU fuses at least a portion of the primitive with at least a portion of one or more preceding primitives to generate a fused primitive. For example, the APU fuses a valid flag and depth data of the portion of the primitive in the tile with a valid flag and depth data of a preceding primitive (e.g., a preceding primitive sharing an edge with the primitive) in the tile stored in an edge buffer to generate a fused primitive. As another example, the APU fuses the valid flag and depth data of the portion of the primitive in the tile with the valid flag and depth data of a preceding primitive as fused with a second preceding primitive (e.g., a previously fused primitive) in the tile stored in an edge buffer to generate a fused primitive. The APU fuses at least a portion of the primitive with at least a portion of one or more preceding primitives by, for example, adding the depth data of the preceding primitives in the tile to the portion of the primitive in the tile, averaging the depth data of the preceding primitives in the tile with the portion of the primitive in the tile, determining maximum depth values, determining minimum depth values, combining valid flags, performing one or more logic operations (e.g., binary logic operations), or any combination thereof. At step 860, the APU determines whether the primitive shares an edge with one or more successive primitives (e.g., primitives for which APU has not yet determined tile coverage) in the tile. If the primitive does not share an edge with a successive primitive, then the system moves to step 870.

At step 870, the APU determines whether the fused primitive is valid in the tile. That is to say, the APU determines whether the fused primitive is associated with one or more flags (e.g., valid flags) that indicate one or more primitives used to generate the fused primitive are invalid in the tile. In response to the fused not being valid in the tile (e.g., one or more flags (e.g., valid flags) associated with the fused primitive indicate a primitive used to generate the fused primitives is invalid in the tile), the system moves on to step 875. At step 875, the APU rejects the depth data of the fused primitive in the tile and, as such, does not pass the depth data of the fused primitive in the tile to the depth buffer. Referring again to step 870, in response to the fused being valid in the tile (e.g., no flags (e.g., valid flags) associated with the fused primitive indicate a primitive used to generate the fused primitives is invalid in the tile), the system moves on to step 875. At step 875, the APU passes the depth data of the fused primitive in the tile (e.g., hierarchical depth data) to the depth buffer. Referring again to step 860, in response to the primitive sharing an edge with one or more successive primitives in the tile, the system moves on to step 865. At step 865, the APU stores a flag (e.g., valid flag) indicating whether the fused primitive is valid (e.g., does not contain a non-shared edge or vertex in the tile) in the tile, the depth data of the fused primitive in the tile, or both in an edge buffer for future primitive fusion.

In some embodiments, the apparatus and techniques described above are implemented in a system including one or more integrated circuit (IC) devices (also referred to as integrated circuit packages or microchips), such as the operation to generate hierarchical depth data using primitive fusion described above with reference to FIGS. 1-8. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   based on a first primitive of a plurality of primitives to be rendered sharing an edge in a tile of an image with a second primitive of the plurality of primitives to be rendered, storing depth data of the first primitive in a buffer;
   fusing at least a portion of the second primitive in the tile with the depth data of the first primitive in the tile in the buffer to generate a fused primitive;
   storing depth data of the fused primitive in the tile in a depth buffer; and
   rendering the first and second primitives using the depth data of the fused primitive stored in the depth buffer.

2. The method of claim 1, further comprising:
   based on the second primitive having a shared edge with a third primitive of the plurality of primitives to be rendered in the tile, storing depth data of the fused primitive in the tile in the buffer.

3. The method of claim 2, further comprising:
   fusing at least a portion of the third primitive in the tile with the depth data of the fused primitive in the tile stored in the buffer to generate a second fused primitive; and
   based on the second fused primitive covering a predetermined threshold percentage of the tile, storing the depth data of the second fused primitive in the depth buffer.

4. The method of claim 3, further comprising:
   based on the first, second, or third primitives being flagged as invalid, rejecting depth data of the second fused primitive such that the depth data of the second fused primitive is not stored in the depth buffer.

5. The method of claim 1 further comprising:
   based on the first primitive having one or more edges that are not shared with one or more other primitives of the plurality of primitives to be rendered, flagging the first primitive as invalid.

6. The method of claim 5, further comprising:
   storing a flag indicating the first primitive as invalid in the buffer.

7. The method of claim 1, wherein fusing the at least a portion of the first primitive in the tile with the at least a portion of the second primitive in the tile is performed concurrently with a visibility pass.

8. A method comprising:
   based on a first primitive of a plurality of primitives to be rendered not covering a predetermined threshold percentage of a tile of an image and based on the first primitive sharing an edge with a second primitive of the plurality of primitives in the tile, fusing at least a portion of the first primitive in the tile with at least a portion of the second primitive in the tile to generate a fused primitive; and storing depth data of the fused primitive in the tile to a depth buffer used to render the primitive and the second primitive.

9. The method of claim 8, further comprising:
based on the first primitive sharing an edge with a third primitive in the tile, storing depth data of the first primitive in the tile in an edge buffer.

10. The method of claim 9, further comprising:
fusing at least a portion of the third primitive in the tile with the depth data of the first primitive in the tile stored in the edge buffer to generate a second fused primitive.

11. The method of claim 10, further comprising:
based on the third primitive sharing an edge with a fourth primitive of the plurality of primitives to be rendered in the tile, storing the depth data of the second fused primitive in the edge buffer.

12. The method of claim 8, further comprising:
based on the first primitive having an edge not shared with one or more other primitives of the plurality of primitives to be rendered, flagging the first primitive as invalid.

13. An accelerated processing unit, comprising:
one or more processor cores including circuitry configured to:
based on a first primitive of a plurality of primitives to be rendered not covering a predetermined threshold percentage of a tile of an image and based on the first primitive sharing an edge with a second primitive of the plurality of primitives to be rendered in the tile, fuse at least a portion of the first primitive in the tile with at least a portion of the second primitive in the tile to generate a fused primitive;
store depth data of the fused primitive in the tile in a depth buffer; and
render the first and second primitives using the depth data of the fused primitive stored in the depth buffer.

14. The accelerated processing unit of claim 13, wherein the one or more processor cores include circuitry configured to:
based on the second primitive having a shared edge with a third primitive of the plurality of primitives in the tile, store depth data of the fused primitive in the tile in an edge buffer.

15. The accelerated processing unit of claim 14, wherein the one or more processor cores include circuitry configured to:
fuse at least a portion of the third primitive in the tile with the depth data of the fused primitive in the tile stored in the edge buffer to generate a second fused primitive.

16. The accelerated processing unit of claim 15, wherein the one or more processor cores include circuitry configured to:
based on the second fused primitive covering the predetermined threshold percentage of the tile, store depth data of the second fused primitive in the depth buffer; and
render the first, second, and third primitives using the depth data of the second fused primitive stored in the depth buffer.

17. The accelerated processing unit of claim 13, wherein the one or more processor cores include circuitry configured to:
store depth data of the first primitive in the tile in an edge buffer; and
fuse the depth data of the first primitive in the tile in the edge buffer with the at least a portion of the second primitive in the tile.

18. The accelerated processing unit of claim 13, wherein the one or more processor cores include circuitry configured to:
fuse the at least a portion of the first primitive in the tile with the at least a portion of the second primitive of the plurality of primitives in the tile of the image concurrently with performing a visibility pass.

* * * * *